US012644544B1

(12) United States Patent
Lane

(10) Patent No.: US 12,644,544 B1
(45) Date of Patent: **\*Jun. 2, 2026**

(54) HIGH PRESSURE CONVERTER HOSE, HIGH PRESSURE CONNECTOR ASSEMBLY AND METHODS OF USE

(71) Applicant: Drug Careers, Inc., Clarksburg, NJ (US)

(72) Inventor: Lisa A. Lane, Clarksburg, NJ (US)

(73) Assignee: Drug Careers Inc, Clarksburg, NJ (US)

( * ) Notice: Subject to any disclaimer, the term of this patent is extended or adjusted under 35 U.S.C. 154(b) by 350 days.

This patent is subject to a terminal disclaimer.

(21) Appl. No.: 18/208,885

(22) Filed: Jun. 13, 2023

Related U.S. Application Data

(60) Provisional application No. 63/366,690, filed on Jun. 20, 2022.

(51) Int. Cl.
| | |
|---|---|
| *F16L 21/00* | (2006.01) |
| *A47L 9/24* | (2006.01) |
| *B05B 15/652* | (2018.01) |
| *F16L 37/04* | (2006.01) |
| *F16L 37/48* | (2006.01) |

(52) U.S. Cl.
CPC .......... *F16L 21/005* (2013.01); *B05B 15/652* (2018.02); *F16L 37/04* (2013.01); *F16L 37/48* (2013.01); *A47L 9/242* (2013.01); *A47L 9/248* (2013.01)

(58) Field of Classification Search
CPC ......... F16L 21/005; F16L 37/04; F16L 37/48; F16L 33/32; F16L 47/20; B05B 15/65; B05B 15/652; B05B 15/654; A47L 9/242; A47L 9/248
See application file for complete search history.

(56) References Cited

U.S. PATENT DOCUMENTS

| | | | | |
|---|---|---|---|---|
| 589,362 | A | * | 8/1897 | Miles |
| 846,905 | A | | 3/1907 | Bruen |
| 964,579 | A | | 7/1910 | Stephens |
| 1,509,484 | A | | 9/1924 | Powell |
| 1,940,244 | A | | 12/1933 | Carlstedt |
| 1,984,347 | A | * | 12/1934 | Sutton ..................... F16L 37/48 |
| 3,338,597 | A | | 8/1967 | Mason |
| 3,346,907 | A | | 10/1967 | Groves |
| 3,781,941 | A | | 1/1974 | MacFarland |

(Continued)

OTHER PUBLICATIONS

Rinseroo, The newly patented Rinseroo, slip-on pet bather is set to make a big splash at the Global Pet Expo next week, Feb. 20, 2020, pp. 4 (Year: 2020).*

(Continued)

*Primary Examiner* — William S. Choi

(74) *Attorney, Agent, or Firm* — Favorito Law LLP; Carolyn Favorito

(57) ABSTRACT

A high pressure connector assembly may include an elastomeric connector comprising an approximately perpendicular flange at a distal end thereof and an opening therethrough; and a rigid compression fitting having an opening aligned with the opening of the elastomeric connector. The high pressure connector assembly may be used with a high pressure converter hose. Kits may include the high pressure connector assembly and a spray head. Related methods include attaching the converter hose to a high flow rate fixture.

17 Claims, 29 Drawing Sheets

(56) References Cited

U.S. PATENT DOCUMENTS

| | | | | |
|---|---|---|---|---|
| 4,400,579 | A | | 8/1983 | Nolf |
| 4,413,362 | A * | | 11/1983 | Chianco |
| 4,563,790 | A | | 1/1986 | Clark |
| 4,720,887 | A | | 1/1988 | Bosyj |
| 5,028,077 | A * | | 7/1991 | Hurst ...................... F16L 37/48 |
| 5,743,570 | A * | | 4/1998 | Garland ................. F16L 37/48 |
| 5,743,572 | A | | 4/1998 | Nishio |
| 5,772,616 | A * | | 6/1998 | Competiello |
| 5,951,060 | A | | 9/1999 | Fukano |
| 5,987,682 | A * | | 11/1999 | Rossi |
| 6,315,220 | B1 * | | 11/2001 | Grubb ..................... F16L 37/48 |
| 8,566,973 | B2 * | | 10/2013 | Duczak |
| 8,910,980 | B2 | | 12/2014 | Neal |
| 9,080,320 | B1 * | | 7/2015 | Taylor ..................... F16L 37/48 |
| 10,393,300 | B1 | | 8/2019 | Lane |
| 11,365,838 | B1 | | 6/2022 | Lane |
| 2022/0371779 | A1 | | 11/2022 | Lane |

OTHER PUBLICATIONS

Screen captures from YouTube video clip entitled "Rinseroo review read description below.", 2 pages, uploaded on Jul. 22, 2020 by user "Justmeandmythoughts55". Retrieved from Internet: <https://www.youtube.com/watch?v=ONMIAre9liw> (Year: 2020).*

* cited by examiner

305

305

313

330

332

331

313

HIGH PRESSURE CONVERTER HOSE, HIGH PRESSURE CONNECTOR ASSEMBLY AND METHODS OF USE

This application claims priority from U.S. Provisional Application Ser. No. 63/366,690, which is incorporated herein by reference.

FIELD

The device is in the field of converter hoses and related methods of use.

BACKGROUND OF THE INVENTION

The high pressure converter hose and connector assembly referenced herein is related to U.S. application Ser. No. 15/061,816, which issued as U.S. Pat. No. 10,393,300, U.S. application Ser. No. 16/536,248, which issued as U.S. Pat. No. 11,085,567, U.S. application Ser. No. 17/002,769, which issued as U.S. Pat. No. 11,365,838, and U.S. Provisional Application Ser. No. 63/366,689, and the utility application claiming priority thereto, the entire contents of which are incorporated by reference in their entirety.

The "Water Bandit" hose fitting is advertised on Amazon.com as a product that connects your standard water hose to various water sources. For example, this product screws onto an existing hose on one end with a brass, male, standard water connection. The other end is advertised as a highly flexible, silicone polymer sleeve that stretches to fit over the end of virtually any standard water source including those with damaged or stripped threads and even of water sources with no threads at all.

The "Water Bandit" hose fitting's customer reviews and questions/answers indicate the silicone polymer end doesn't stretch much but conforms and indicates its unsuitability for a pull out kitchen faucet head about 2.5" in diameter, or slightly flared bathroom faucets. Consumer reviews indicated a hose clamp may be needed to keep it on a faucet and that it only operates effectively when the water pressure is very low. Further, users reported the metal fitting has a smooth insert portion and therefore easily detaches from the silicone polymer sleeve, and the silicone sleeve is prone to tearing, sometimes due to clamping necessary to keep the hose fitting on water source.

U.S. Pat. Nos. 10,393,300 and 11,085,567 relate to the converter hose marketed as the Rinseroo, which faces issues with high pressure coming from tub spouts or other fixtures without pressure control. The Amazon.com website page for ordering a Rinseroo converter hose states that it is not "for use on a tub spout unless you can reduce water flow."

There is a need in the art for a converter hose that can operate at high water pressure without the pressure causing the connector portion to detach from the tub.

SUMMARY

Other features and advantages will be apparent from the following detailed description, the drawings, and the claims.

In some aspects, the high pressure connector assembly may comprise an elastomeric connector having an opening therethrough comprising a body portion and connector flange portion at a distal end thereof. The connector flange portion may be approximately perpendicular to the body portion. In some aspects, the high pressure connector assembly may comprise a rigid compression fitting having an opening aligned with the opening of the elastomeric connector. The rigid compression fitting may comprise a female cap, a double sided male component, and an insert having dimensions to fit therebetween. The insert may comprise a tube portion and an insert flange portion, wherein the insert flange portion may be approximately perpendicular to the tube portion. The insert flange portion may be proximate a first end of the insert and may be about the same circumference as the connector flange portion. The tube portion may be proximate a second end of the insert and may have a length that is shorter than a length of the elastomeric connector and may have an outer circumference that may be about the same as an inner circumference of the elastomeric connector. The double sided male component may comprise a male hose end that attaches to a hose when in use.

In some aspects, a proportion of an inner diameter of the tube portion proximate the insert flange portion to a narrowest inner diameter of the male hose end, or a proportion of an inner circumference of the tube portion proximate the insert flange portion to a smallest inner circumference of the male hose end may be 2:1 or less, such as 1:1 to 1.8:1.

In some aspects, a proportion of a distance between openings in the tube portion to a distance between openings of the elastomeric connector in its resting state may be about 0.16:1 to 0.25:1; and/or a proportion of a wall thickness of the elastomeric connector at the distal end thereof the distance between openings of the elastomeric connector in its resting state may be about 0.06:1 to 0.12:1.

In some aspects, the inner diameter of the tube portion may be about ⅞" to 1⅛" and the narrowest inner diameter of the male hose end is about ½ to ¾". The distance between the openings in the tube portion may be at least 0.7" to about 2". The distance between openings of the elastomeric connector may be about 3.5-5.5 inches.

The wall thickness of the elastomeric connector at a distal end thereof may be about ¼" to ½". The distance between openings of the elastomeric connector may be about 3.5-5.5".

In some aspects, a high pressure converter hose may comprise the high pressure connector assembly herein, and a hose coupled to the male hose end.

The distal end of the elastomeric connector in its resting state may have an inner diameter and/or an inner circumference, and a first end of the hose may have an inner diameter and/or an inner circumference. In some aspects, a proportion of the inner diameter of the elastomeric connector at the distal end thereof in its resting state to the inner diameter of the first end of the hose, and/or a proportion of the inner circumference of the distal end of the elastomeric connector in its resting state to the inner circumference of the first end of the hose, may be about 1:1 to 1.5:1.

In some aspects, the hose of the high pressure converter hose is more rigid than the elastomeric connector. In some aspects, an elastomeric connector may have a proximal end and a distal end. The distal end of the connector may be coupled to a first end of a hose. The elastomeric connector may comprise a thermoplastic elastomer. The elastomeric connector may have a wall thickness of about ¼" to ½". The thermoplastic elastomer may have a Shore type A value of about 0 or a Shore Type OO value of about 30-50.

In some aspects, the high pressure converter hose may comprise an elastomeric connector comprising a thermoplastic elastomer that may have: a) a tensile strength at least in one direction at break of about 1-3 MPa; or b) a tensile elongation at least in one direction at break of 600%-700%.

In some aspects, the high pressure connector assembly may comprise a male hose end that may be threaded and may be attached to a standard ¾" garden hose with a threaded fitting when in use. In some aspects, the high pressure connector assembly further comprised a spray head attachment comprising a standard female ¾" garden hose threaded fitting.

In some aspects, a kit may comprise the high pressure connector assembly herein; and a spray head attachment comprising a standard female ¾" garden hose threaded fitting.

In some aspects, the high pressure connector assembly comprises an elastomeric connector wherein a single one of the elastomeric connector may self seal about peripheries of both a tub spout and a hose bib without detaching when in use. In some aspects, the high pressure converter hose comprises an elastomeric connector, wherein the elastomeric connector may not detach from the tub spout or the hose bib when subjected to a flow rate of 5-10 GPM when in use.

In some aspects, the hose of the high pressure converter hose may have an internal diameter of at least ⅝" to 1" such as ¾"; and/or the elastomeric connector in its resting state may have an internal diameter of at least ⅝" to 1" such as about 1".

In some aspects, the high pressure converter hose may comprise an elastomeric connector having a proximal end for receiving various shaped high pressure fixtures when in use and a distal end coupled to a first end of a hose; wherein the hose may comprise a relatively more rigid material than the elastomeric connector; wherein a single one of the elastomeric connector may self seal about peripheries of various shaped fixtures comprising a tub spout having an outer dimensions of a 1" square opening, a 1.5" by 2" rectangular opening, a 2.5" diameter round opening, and a 1" diameter round opening when in use; and/or wherein the elastomeric connector may not detach from the tub spout when subjected to a flow rate of 5-10 GPM when in use.

A method of using the high pressure connector assembly or high pressure converter hose may comprise affixing the elastomeric connector to a water fixture.

BRIEF DESCRIPTION OF DRAWINGS

FIGS. 6*a*-6*e* is an embodiment of a double sided male component, wherein the larger male threaded end is complementary to a threaded female cap of a connector assembly and the smaller male end is unthreaded and inserts into a hose. FIGS. 6*f* and 6*g* are views including a cutaway view of an embodiment of a double sided male component, wherein the larger male threaded end is complementary to a threaded female cap of a connector assembly and the smaller male threaded end is complementary to a threaded female end of a standard garden hose fitting (not drawn to scale).

DESCRIPTION OF EMBODIMENTS

Figure 1:
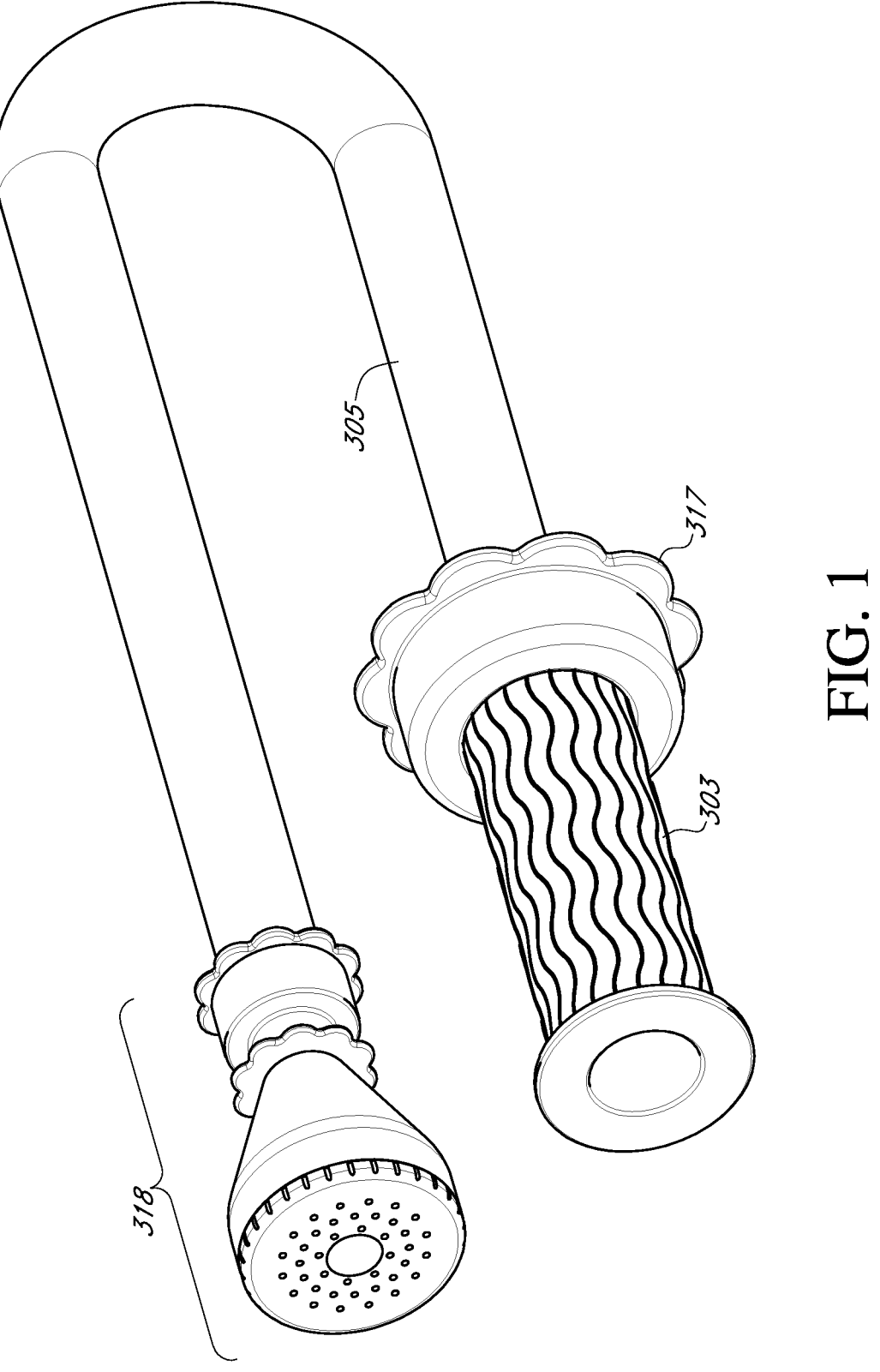
FIG. 1 is a fully assembled view of an embodiment of a high pressure converter hose comprising the high pressure connector assembly and sprayer hose assembly herein.

The flow rates from bathroom faucets, kitchen faucets and shower heads are regulated by law in an attempt to decrease water usage in accordance with the Environmental Policy and Conservation Act. A sink faucet is restricted to a maximum flow of 2.2 gallons per minute (gpm). The same U.S. law restricts shower heads to a maximum flow of 2.5 gpm. Some states, like California, require lower flows, 1.2 gpm for bath sink faucets and 1.8 gpm for kitchen sink faucets. A faucet may momentarily flow at a greater rate, up to 2.2 GPM and usually does not exceed 2.5 gallons per minute (GPM). Tub spouts, however, are not subjected to the flow rate restrictions because tubs are generally filled and slowing the water rate would only have the result of taking more time to fill, not cutting overall water usage. Generally standard ½" supply pipes will fill a tub at a rate of about 8.0 GPM when the pipes are new, and some can fill up to 10 GPM. Many tubs spout valves are unable to open gradually, such as when a diverter valve is used, in which case water will flow immediately at the maximum pressure and flow rate through tub spouts, which pressure causes conventional converters hoses, for example, to break or detach from the water source.

Similarly, the flow rates from hose bibs are unregulated. Some camping grounds provide hose bibs having standard hose fittings for attaching typical garden hoses, for example, to fill a camper's water tank so that it can be used when traveling away from a campsite. Similar hose bibs are found outside residential homes. Often the hose bib becomes rusty or the threads wear down making it difficult to attach a hose, or attach a hose without the hose leaking at the point of connection. As water flow rates coming from hose bibs are typically unregulated, significant initial pressure may cause a connector or hose to become easily detached.

Pressure levels in residential homes tend to range between 45 and 80 pounds per square inch (PSI) and are usually about 60 PSI. Private residential wells use a pressure tank and may set the water pressure at 30-40 PSI. However, many factors influence the final water pressure in a home. The elevation of the building relative to both the height of the tank/tower and the location of the water main can make a significant difference, as can the size of the main and the number of homes connected to it. A service line (the pipe connecting the home to the main) not properly sized for the home's needs can also affect the final pressure at the tap.

U.S. Pat. Nos. 10,393,300 and 11,085,567, recite a self-sealing converter hose, which prevents a substantial amount of fluid such as water to escape the proximal end of the connector during use. U.S. application Ser. No. 17/002,769 addressed issues related to attaching the relatively soft connector such as thermoplastic elastomer (TPE) connector, to relatively more rigid hose without the soft TPE connector detaching from the remainder of the converter hose after repeated use. Additional issues arose when using the converter hose as outlined below, which have been overcome using the high pressure converter hose and connector assembly herein.

The main issue with converters like the Water Bandit hose fitting or the Rinseroo converter hose currently on the market, is the tendency for the portion that attaches to the water source to become disconnected and for the hose fitting to detach from the Water Bandit's silicon polymer or Rinseroo's TPE connector. Specifically, only low water pressure or flow rates were tolerated with the Water Bandit hose fitting, and although the Rinseroo converter hose was able to withstand medium faucet or shower head flow rates and pressure, the Rinseroo converter hose unsatisfactorily may detach from tub spouts and the connector may detach from the connector assembly. In addition, if a spray head was attached to the Rinseroo converter hose, it may not withstand a higher flow rate needed to form a spray, and a spray would not form.

It would be beneficial if one or more components of the high pressure converter hose such as the connector, coupler part, hose, spout, spout plate and threaded double sided male component were easily detachable so that the high pressure converter hose could be easily disassembled and a damaged or worn component could be replaced. In some aspects, the hose portion of the high pressure converter hose could be extended via the threaded end having a standard male water hose fitting to make a longer hose using a standard garden hose.

Aspects of the high pressure connector assembly and high pressure converter hose herein overcome these usage and/or component replacement problems with conventional attachment hoses.

In some aspects, a high pressure converter hose is a self-sealing, slip on-slip off device that may be used to safely rinse shower, tub walls and pets, which is lightweight and portable, and where a single device can be used on many different sized fixtures, including tub spouts and hose bibs having a flow rate of greater than 4 GPM. In some aspects, the high pressure converter hose may be quickly attached to and removed from one tub spout and attached to and removed from another.

A converter hose marketed as the "Rinseroo" based on the patents and patent applications described above was attempted to be used as a high pressure converter hose. See Comparative Example 1 including the dimensions, materials and testing of the original Rinseroo converter hose. The original Rinseroo converter hose overcame some shortcomings of conventional converter hoses and hose fittings; however, the original Rinseroo converter hose did not overcome all complaints and shortcomings associated with conventional attachments for situations when used with tub spouts that have a high flow rate of over 4 GPM. First, in some instances, complaints were received that the original Rinseroo converter hose would easily detach from the tub spout due to excessive initial pressure. In addition, the original Rinseroo connector would detach from the original Rinseroo connector assembly. In some cases, even when the connector was properly affixed to the tub spout, the connector would fill with water and stretch before detaching when attached to a tub spout.

In some aspects, the combination of selected variables achieve one or more unexpectedly beneficial results, such as, staying adhered to the tub spout while withstanding high flow rates of over 4 GPM. In addition, regarding the high pressure connector assembly herein, the part remained intact unlike the Water Bandit and the component parts could easily be disassembled and assembled.

Moreover, the high pressure converter hose herein provides a user with a self-sealing, easy to affix, slip-on-slip off connector which can withstand higher flow rates and water pressure.

Various proportions of various elements were selected and combined to overcome the issues with conventional hose fittings and the original Rinseroo converter hose, e.g., as described in Comparative Example 1. In some aspects, various dimensions of the connector, portions of the compression fitting, and hose were selected and combined to achieve the results needed without the problems associated with conventional hose attachments and hose fittings. In some aspects, the proportion of the inner diameter (or inner circumference) of the portion of the connector, e.g., closest to the hose, and in its resting state to the inner diameter (or inner circumference) of the hose unexpectedly avoided problems in the art, such as detachment issues regarding the connector detaching from the tub spout and the connector detaching from the connector assembly when using a high flow rate and high pressure, for example if the valve was opening quickly to fully open instead of gradually until low or medium pressure. The proportion of the inner diameter (or inner circumference) of the connector (closest to the hose and in its resting state) to the inner diameter (or inner circumference) the hose may be 1.5 (i.e., 1.5:1; or 1.5" internal diameter/circumference of the connector to 1" internal diameter/circumference of the hose) or less, such as in the range of proportions of about 1-1.5, 1-1.4, or 1.3-1.4, for example 1, 1.1, 1.2, 1.3, 1.4 or 1.5. For instance, the proportion of the inner diameters (or inner circumferences) of 1" of the connector (closest to the hose and in its resting state) and of 0.75" of the hose is about 1.33. In contrast, the proportion of the inner diameter (or inner circumference) of the connector to the inner diameter (or inner circumference) of the hose of the original Rinseroo converter hose is about 2 (i.e., 1" diameter of connector to 0.5" diameter of the hose).

In some aspects, the inner diameter of the portion of the connector in its resting state closest to the hose may be about ¾" to 2", ¾" to 1.5", ¾" to 1.25" "or about 1".

In some aspects, the inner diameter of the hose may be about ⅝"-1.5", such as ⅝"-1.25" or ¾"-1" or about ¾" without threads or about 1" when threaded, which has about the same dimensions as the outer diameter of the male hose end.

In some aspects, when a compression fitting is used, the proportion of the inner diameter (or inner circumference) of the tube portion of the insert to the inner diameter (or inner circumference) of the opening of the male end that inserts into the hose end measured at its narrowest inner diameter (or smallest inner circumference) unexpectedly avoided problems in the art, such as, detachment issues regarding the connector detaching from the tub spout and the connector detaching from the connector assembly when using a high flow rate and high pressure. The proportion of the inner diameter (or inner circumference) of the tube of the insert to the inner diameter (or inner circumference) of the opening in the male end that inserts into the hose end may be 2 or less (i.e., 2:1 or less), such as in the range of about 1-2, 1-1.8, 1.4-1.8, 1.4-1.7, or 1.5-1.6, for example about 1, 1.1, 1.2, 1.3, 1.4, 1.5, 1.6, 1.7 or 1.8. For example, the inner diameter of the tube of the insert of about 1" or $^{15}\!/_{16}$" to the inner diameter of the opening of the male end that inserts into the hose of about $^5\!/_8$" has a proportion of about 1.6 or 1.5 respectively. In contrast, the proportion of the Rinseroo converter hose is about 2.3 (i.e., the inner diameter of the tube of the insert of about 1" to the inner diameter of the opening of the male end that inserts into the hose of about $^7\!/_{16}$").

In some aspects, the inner diameter of the tube portion closest to the insert flange may be about $^3\!/_4$" to 2", $^3\!/_4$" to 1.5", $^3\!/_4$" to 1.25", $^{15}\!/_{16}$" to $^{17}\!/_{16}$" or about 1" or about $^{15}\!/_{16}$".

In some aspects, the inner diameter of the male hose end at its narrowest diameter may be about $^1\!/_2$"-1", $^1\!/_2$"-$^3\!/_4$", $^9\!/_{16}$"-$^{11}\!/_{16}$" or about $^5\!/_8$".

In some aspects, when a compression fitting is used, the proportion of the length (height) of the tube portion of the insert (i.e., the distance of the insert from one opening to the other) to the length of the elastomeric connector in its resting state (i.e., distance between openings in the elastomeric connector) unexpectedly avoided problems in the art. The proportion of the length of the tube to the length of the connector. For example the proportion of the length of the insert 315 to the length of the connector 303 is about: 0.16-0.25, (i.e., 0.16:1 to 0.25:1) such as about 0.16-0.22, 0.17-0.21, or 0.18-0.2 or about 0.19. For example, the length of the tube of the insert of about 0.81" to length of a 4.5" connector is about 0.18. In contrast, the proportion of the length of the tube of the insert to the length of the connector Rinseroo converter hose is about 0.12 (i.e., 0.56 length of tube to 4.5" of the connector).

In some aspects, the length of the tube portion of the insert (i.e., the height of the insert) may be at least 0.7" such as about 0.7"-2", 0.7"-1.5", 0.7"-1", 0.7"-0.9", 0.8"-1" or about 0.81".

In some aspects, the proportion of the wall thickness of the connector at an end closest to the hose (excluding the flange) to the length of the connector in its resting state unexpectedly avoided problems in the art. For example, the proportion of the wall thickness of the connector to the length of the connector 303 is about: 0.06-0.12, (i.e., 0.06:1 to 0.12:1), such as about 0.06-0.1, 0.07-0.1, 0.07-0.09 or about 0.08. For example, the wall thickness of the connector of about 0.38" to length of a 4.5" connector is about 0.08. In contrast, the proportion of the wall thickness of the connector to the length of the connector Rinseroo converter hose is about 0.04 (i.e., about 0.19" wall thickness of the connector to 4.5" of the connector).

In some aspects, the wall thickness of the connector in its resting state is about $^1\!/_4$" to $^1\!/_2$" or $^1\!/_4$" to $^3\!/_8$" thick.

Thus, the proportions of the original converter hose were not simply uniformly increased in size to make the high pressure converter hose. Rather, various dimensions were selected and combined in particular proportions to make the high pressure converter hose.

In some aspects, the high pressure converter hose is comprised of a thermoplastic elastomer connector having a proximal end and a distal end; wherein, when in use, the proximal end self-seals about a periphery of an existing high flow rate fixture and allows a liquid to free-flow through the high flow rate fixture and the connector; wherein the distal end is coupled to a first end of a hose.

A method of using the high pressure converter hose herein may comprise attaching the proximal end of the connector to high flow rate fixture such as tub spout or bib. The method may further comprise flowing water though the high flow rate fixture, wherein the connector self-seals about the periphery of the high flow rate fixture during the flowing step.

A method may further include rolling down the proximal end of the connector 303 over itself so it can fit, e.g., a fixture with a smaller circumference than the connector.

In some aspects as seen in the figures herein, the high pressure converter hose includes a self-sealing, slip on slip off, connector 303 and a flexible hose 305, which may be non-metal, that may be used with an existing tub spout or bib. In one embodiment, a self-sealing, slip on connector 303 comprises a hollow, extremely flexible tube shaped member for receiving a tub spout or bib. The self-sealing connector 303 is comprised of a self-scaling, extremely stretchy, flexible and durable material such as a flexible thermoplastic elastomer. In some aspects, the connector is not silicone polymer.

The self-scaling connector 303 has a proximal end and a distal end. The self-sealing connector 303 is attached, for example, to a high flow rate fixture by stretching and sliding the proximal end of the connector over the high flow rate fixture.

In some embodiments, a "self-sealing" connector is sufficiently flexible and has sufficient memory such that the connector does not require a clamping means, securing means, connecting means, or other mechanical means such as a ring clamp, clip, clasp, grip, a vise, a fastener, an additional flexible band, or a threaded female coupler connected to a male coupler on a spigot, to secure the connector to an existing high flow rate fixture when in normal use, while preventing a substantial amount of fluid such as water to escape the proximal end of the connector during use. Thus, in some aspects, the high pressure converter hose omits the clamping, securing or connecting means at the proximal end, which may prevent the hose from slipping off the fixture and presumably prevent leakage proximate the open end of the connector, while retaining the function of leakage prevention and lack of slippage. In some embodiments, preventing a substantial amount of fluid means at least less than 10% of the amount of fluid from the source, such as less than 8%, 5%, 2% of the amount of fluid from the source, or none or almost none of the fluid, escapes during use, for example when the water is flowing at well over 4 GPM such as 5, 6, 7, 8, 9, 10, 11, or 12 GPM or at least 5 GPM, for example, 5-6, 5-7, 5-8, 5-9, 5-10, 5-11 or 5-12 GPM, 6-7, 6-8, 6-9, 6-10, 6-11, or 6-12 GPM, 7-8, 7-9, 7-10, 7-11 or 7-12 GPM, 8-9, 8-10, 8-11, or 8-12 GPM. In some aspects, no fluid or almost no fluid such as less than 1%, 0.1%, or 0.01% of the water flowing through the high pressure converter hose escapes the proximal end of the connector when in use, or all or substantially all of the fluid passes through the distal end of the connector to the hose and the connector of the high pressure converter hose does not detach from the high flow rate fixture.

Without being bound by theory, it appears that the self-sealing connector, when in use, allows the free flow of water through the connector that forms a vacuum seal about the periphery of a high flow rate fixture, while the connector concomitantly has sufficient elastomeric properties to directly contact and grip a larger percentage of the high flow rate fixture's surface area to counter the force from the flow of liquid that would be sufficient to cause other, more rigid connectors such as the Water Bandit hose fitting, which may be unable to grip such a large surface area on high flow rate fixtures of varying sizes, to detach from the fixture. In some aspects, the length of the connector that directly contacts a high flow rate fixture when in use (see e.g., FIG. 12c) is at least about 70% the length in its resting state (see e.g., FIG. 1) from the center of an opening on the proximal end to the center of the opening of the distal end of the connector such as 70%, 80%, 90% or 100%. In some aspects, the connector and the high pressure fixture do not have significant air pockets, water-holding passages, or an additional part situated between the connector and the fixture when in use, thus allowing direct contact and self-sealing around a fixture when in use.

In some embodiments, the connector comprises a thermoplastic elastomer or any other material or mixture of materials that has similar properties. Some materials have been referred to as "super elastic plastic." In some aspects, thermoplastic elastomers (TPEs) may comprise polymers or copolymers or blends of thereof that are formulated to provide the properties outlined below. For instance, TPEs may contain block copolymers such as styrene based block copolymers including styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, or styrene-isoprene-styrene block copolymers, or a combination thereof. Thermoplastic urethanes also may be useful and may be formulated to provide appropriate properties. In some aspects, TPEs may contain a styrene butadiene styrene block copolymer or styrene ethylene butadiene styrene block copolymers.

In some aspects, a single TPE connector can be stretched a sufficient amount to accommodate various size high flow rate fixtures, yet after being fitted on the high flow rate fixture, the connector will have elastomer properties such that upon contraction, the connector self-seals about a periphery of the high flow rate fixture, and when removed the connector may return to its resting shape. In some aspects, the connector having the same size in its resting state could accommodate a range of high flow rate fixtures that are at least twice the size relative (such as twice, three time or four times the diameter or circumference) to the other, for example, 2-20 times the size relative to another such as 2-10, 2-5, 2-3, 4-16, 3-8, or 5-8 times the size relative to another. In some aspects, assuming a high flow rate fixture was cylindrical, a single 1" diameter cylindrical elastomeric connector or opening (or an elastomeric connector having a similar circumference) could accommodate various cylindrical high flow rate fixtures having e.g., at least a 2", 3" or 4" diameter or opening (or a high flow rate fixture having a similar circumference). Not all high flow rate fixtures are symmetrical, and also connectors are sufficiently flexible so that they do not need to match the shape of the high flow rate fixture. Thermoplastic elastomers or super elastic plastics are commercially available under trade names such Kraton® D2104, Dynaflex® G6713-001, Dynaflex® G6713C, Versaflex® OM9-802CL or Versaflex® CL2000X. Some or all commercial TPEs are proprietary polymers or copolymers, or blends thereof having proprietary formulations containing components such as crosslinking agents or additives, which affect the properties identified below. TPE suppliers may readily provide materials based on one or a combination of the properties below. In some aspects, a combination comprising primarily about 75% by weight Kraton® G1651 H, a clear, linear copolymer based on styrene and ethylene/butylene (with a polystyrene content of about 33%) and about 25% by weight Kang Libo 15 #white oil cosmetic product are used to make the TPE connector, and secondarily, from a weigh perspective, propriety additives and dyes. The white oil lends properties to the combination making the resulting material less hard than the Kraton® G1651 H while providing similar strength and elasticity Kraton® G1651 H. For example, Kraton® G1651 H has a hardness of Shore Type A using ASTM 2240 at 10 seconds at 23° C. of 60, which may prove too hard to use as the only component for making the TPE connector. The tensile strength of Kraton® G1651 H is less than about 5.5 and the elongation at break is less than 800%, which are both in range for the material used for making the final TPE connector herein. In addition, the material in Examples 1 or 2 may be used.

In some aspects, the super elastic plastic or thermoplastic elastomer may have a tensile stress at least in one direction measured according to ASTM D412 at 100% strain or 300% at 23° C. of less than about 15 MPa, such as about 0.01-10 MPa, about 0.05-5 MPa or about 0.05-3 MPa. Tensile stress of the same material may have lower values at 100% strain versus 300% strain. In some aspects, tensile stress at 100% strain at 23° C. may be less than about 10 MPa, such as about 0.01-5 MPa, about 0.03-2.5 MPa, or about 0.06-1.5 MPa, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2 MPa, such as 0.18 MPa. Alternatively, in some aspects tensile stress at 300% strain at 23° C. may be about 0.1-10 MPa, about 0.1-5 MPa, about 0.1-3 MPa, about 0.1-1 MPa, about 0.2-0.7 MPa, about 0.3-0.6 MPa or about 0.4-0.5 MPa, such as about 0.46 MPa or such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 MPa, or any range among these values.

In some aspects, the tensile strength of the super elastic plastic or thermoplastic elastomer at least in one direction at break measured according to ASTM D412 at 23° C. may be about 0.1-15 MPa, such as from about 0.1-10, 0.5-5, 0.5-8, 1-8, 1.1-2.2, 1.2-2.1, 1.3-2, 1.4-1.9, or 1.5-1.8, MPa, and typically have a value of about 0.5, 1, 2, 3, 4, 5, 6, 7, 8, 9, or 10 MPa, or any range among these values. In some aspects, the tensile strength is about 1.0-2.0 Mpa such as 1.0, 1.1, 1.2, 1.3, 1.4, 1.5, 1.6, 1.7, 1.8, 1.9, or 2.0 Mpa, such as 1.5 MPa or 1.8 Mpa.

In some aspects, the tensile elongation of the super elastic plastic or thermoplastic elastomer at least in one direction at break measured according to ASTM D412 at 23° C. may be 50% or greater such as about 100%-5000%, about 200%-3000%, about 300%-2000%, or about 500%-1500%, or about 500%, 600%, 700%, 800%, 900%, 1000%, 1100%, 1200%, 1300%, 1400%, or 1500%, or any range among these values. In some aspects, the tensile elongation is about 660% to break.

In some aspects, the tear strength of the super elastic plastic or thermoplastic elastomer measured according to ASTM D624 is about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the stress at break of the super elastic plastic or thermoplastic elastomer measured according to ASTM D2240 may be about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the durometer hardness Shore Type A or Shore Type OO of the super elastic plastic or thermoplastic elastomer measured according to ASTM D2240 for 10 seconds at 23° C. may have a value of about 0-50, such as about 0-45, about 2-40, or about 3-15 such as about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or any range among these values. The durometer hardness of Shore Type A of the super elastic plastic or thermoplastic elastomer measured according to ASTM D2240 for 10 seconds at 23° C. may have a value on the lower end of the given range, for example, about 0-20. The durometer hardness of Shore Type OO of the super elastic plastic or thermoplastic elastomer measured according to ASTM D2240 for 10 seconds at 23° C. may have a value on the higher end of the given range of about 30-50. For example, the Shore Type A durometer hardness may be about 0-1 such as 0, or the Shore Type OO may be about 30-50, 40-50, or 35-45 such as about 40 or 45. In some aspects, the density of the super elastic plastic or thermoplastic elastomer measured according to ASTM D2240 or ASTM D792 may be about 0.01-5 g/cm³, about 0.5-2 g/cm³, or about 0.8-1.5 g/cm³, such as about 0.8, 0.9, 1.0, 1.1, 1.2, 1.3, 1.4, 1.5, 1.6, 1.7, 1.8, 1.9, or 2.0 g/cm³, or any range among these values.

In some aspects, the shrinkage of the super elastic plastic or thermoplastic elastomer measured according to ASTM D2240 may be about 0.01-5%, about 0.5-2%, or about 0.8-1.5%, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0%, or any range among these values.

In some aspects, the melt flow of the super elastic plastic or thermoplastic elastomer measured according to ASTM D2240 may be about 25-150 g/10 min, such as about 50-100 g/10 min, about 75-95 g/10 min, such as about 75, 76, 77, 78, 79, 80, 81, 82, 83, 84, 85, 86, 87, 88, 89, 90, 91, 92, 93, 94, 95, 96, 97, 98, 99, or 100 g/10 min, or any range among these values.

In some aspects, the melt flow of the super elastic plastic or thermoplastic elastomer measured according to ASTM D2240 may be about 25-150 MPa, such as about 50-100 MPa, about 75-95 MPa, such as about 75, 76, 77, 78, 79, 80, 81, 82, 83, 84, 85, 86, 87, 88, 89, 90, 91, 92, 93, 94, 95, 96, 97, 98, 99, or 100 MPa, or any range among these values.

In some aspects, the compressive strength of the super elastic plastic or thermoplastic elastomer measured according to ASTM D2240 may be about 1-50%, such as about 1-45, about 2-40, or about 3-30 such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% or any range among these values.

In some aspects, the brittle temperature of the super elastic plastic or thermoplastic elastomer measured according to ASTM D2240 may be about −80 to −50° C., such as about −75 to −55, about −72 to −58 or about −75, −74, −73, −72, −71, −70, −69, −68, −67, −66, −65, −64, −63, −62, −61, −60, −59, −58, −57, −56, −55, −54, −53, −52, −51, or −50° C. or any range among these values.

The super elastic plastic or thermoplastic elastomer may have one or more of the properties above (e.g., tensile stress, tensile strength, tear strength, tensile elongation, or durometer hardness), such as one or more of tensile strength, tensile elongation and durometer hardness.

In some aspects, the connector, compression fitting, hose and other attachments related to the high pressure converter hose is made from materials that can withstand water temperatures such as about 100-150° F. while maintaining the self-sealing attributes of the connector without deforming the high pressure converter hose.

The length of the connector may be sufficient to accommodate various shaped high flow rate fixtures in its expanded state. The length of the elastomeric connector (i.e., distance between openings in the elastomeric connector) may be, for example, from about 3-10 inches such as about 3-7 inches, about 4-6 inches, about 4-5 inches, 2.5'-5", about 3.5" to 5.5", about 3"-4.5" or about 4.5 inches in length in its resting state. In some aspects, the proportions herein are relevant to the length of the connector. The connector, such as the TPE or super elastic plastic connector, in some aspects, may have a wall thickness of about ⅟32" to ½" thick such as about ⅟16" to ¼" thick, ¼ to ⅜", ¼ to ½", or ⅜ to ½" thick for example, about ⅟16", ⅛", 3/16", ¼", 5/16" or ⅜" wall thickness. In some aspects, the proportions herein are relevant to the wall thickness. In its expanded state, the connector may stretch in any direction (e.g. horizontally, vertically, diagonally, lengthwise, widthwise, circumferentially, etc.) in which it is expanded about 2-20 times, such as about 4-16 or about 8-10 times, in comparison to the resting state dimensions, allowing an elastomeric connector having a fixed size to accommodate various size high flow rate fixtures, such as those in Example 1. By any direction e.g., horizontally, vertically, diagonally, lengthwise, widthwise, or circumferentially, refers to stretching the entire connector e.g., from one end to another lengthwise, from side to side widthwise, from corner to corner diagonally, or outwardly from a diameter circumferentially, etc. When in a stretched state, for example, when fitted to an existing high flow rate fixture, the connector may have a dimension such as a diameter of a cylindrical connector at its widest part of about 0.5-10 inches, for example 1-10, 1-8, 1-5, 1-3, 2-5 or 2-3 inches. For example, the inner or outer diameter of a cylindrical connector may be about 0.25-10 inches, about 0.5-5 inches, about 0.5-3 inches, about 0.5-2 inches may be about 1 inch. The inner diameter of the connector as previously listed may be about the same as outer diameter of the tube portion of the insert, for example, 1". Other shaped elastomeric connectors may have similar inner or outer dimensions from one side to the other side of the elastomeric connector, for example, between facing sides of a cuboid or prism.

The connector may have similar sized openings on either end or the distal end may be narrower than the proximal end, such as wherein the connector may have, at least partially, a funnel or conical shape, although the connector may be formed in any suitable shape that will accommodate a high flow rate fixture of various sizes such as cylindrical, spherical, barrel shaped or prism shaped, rectangular prism, arbitrarily shaped, or variations thereof.

Figure 11:
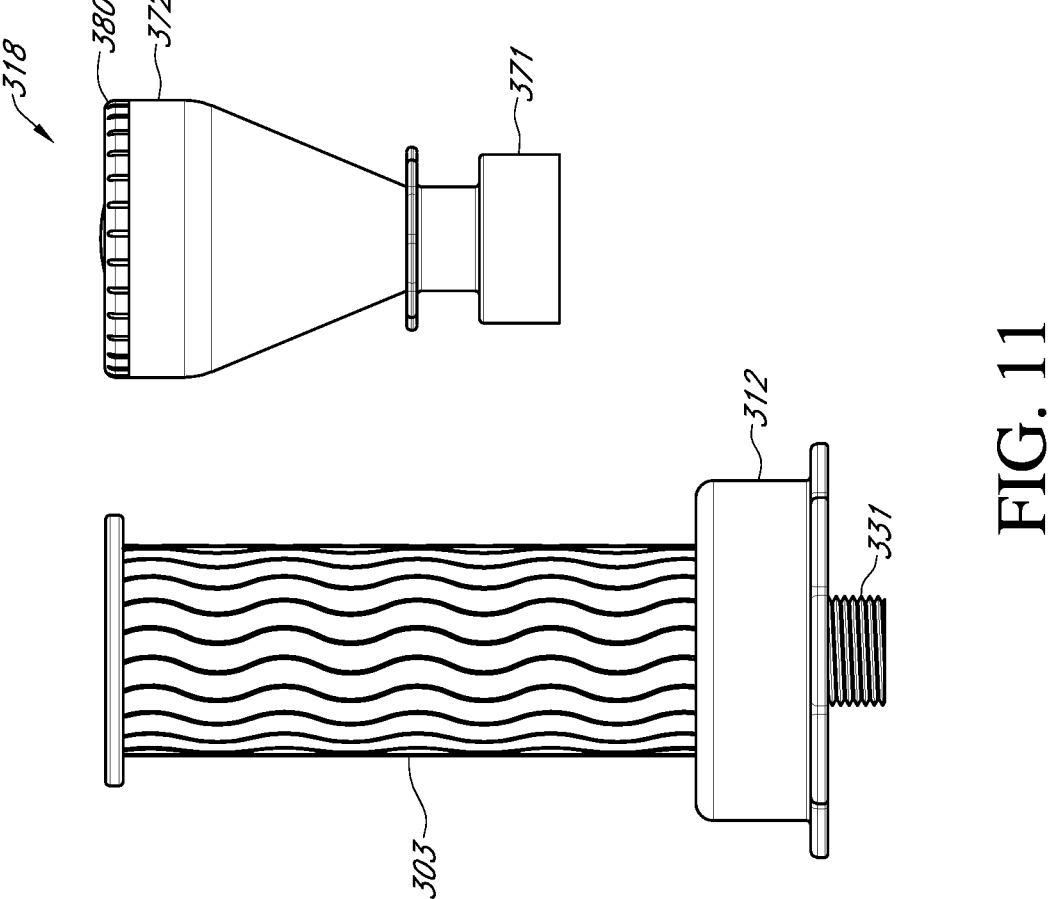
FIG. 11 is an embodiment of a kit that includes a high pressure connector assembly with a double sided male component that is threaded to fit a female end of a standard garden hose and a sprayer hose assembly comprising a threaded female portion that is complementary to a the male end of a standard garden hose.

In some aspects of the high pressure converter hose herein, the distal end of the connector is coupled to the first end of the hose, for example, with a clamp. Aspects of the high pressure converter hose or high pressure connector assembly of FIGS. 1-15, which are described below, may be used wherein the coupler/compression fitting 317 herein replaces a clamp or securing means between the flexible hose and the self-sealing connector 303, and the self-sealing elastomeric connector 303 is modified with a connector flange 320 to be used with the coupler/compression fitting 317. The flexible hose 305, has a first end, and a second end. The hose may be made from any material suitable for its purpose. In some aspects, a typical hose may be made from a flexible material, for example, TPE, vinyl, polyvinyl chloride (PVC), silicone, or latex, The hose may be any suitable length, such about 1'-10' or greater. In some aspects, the hose length may be about 2'-8', 3'-7', 4'-6' or about 5'. In some aspects, the connector assembly, for example, of FIG. 11 may attach to a standard garden hose. In some aspects, the hose is non-metal. The hose may be formed having any suitable cross section such as a round, oval, square, diamond, rectangular or oblong cross section or variations thereof that are sufficiently flexible so that the hose can be connected to the male hose end, e.g., having a round cross section, or to the connector through another means.

In some aspects, the hose is reinforced, such as with fibers or thickened portions, e.g., arranged as a mesh, spirals, or ribs, which is integral with the flexible material such as PVC, which may provide strength or structure while retaining flexibility.

Figure 2:
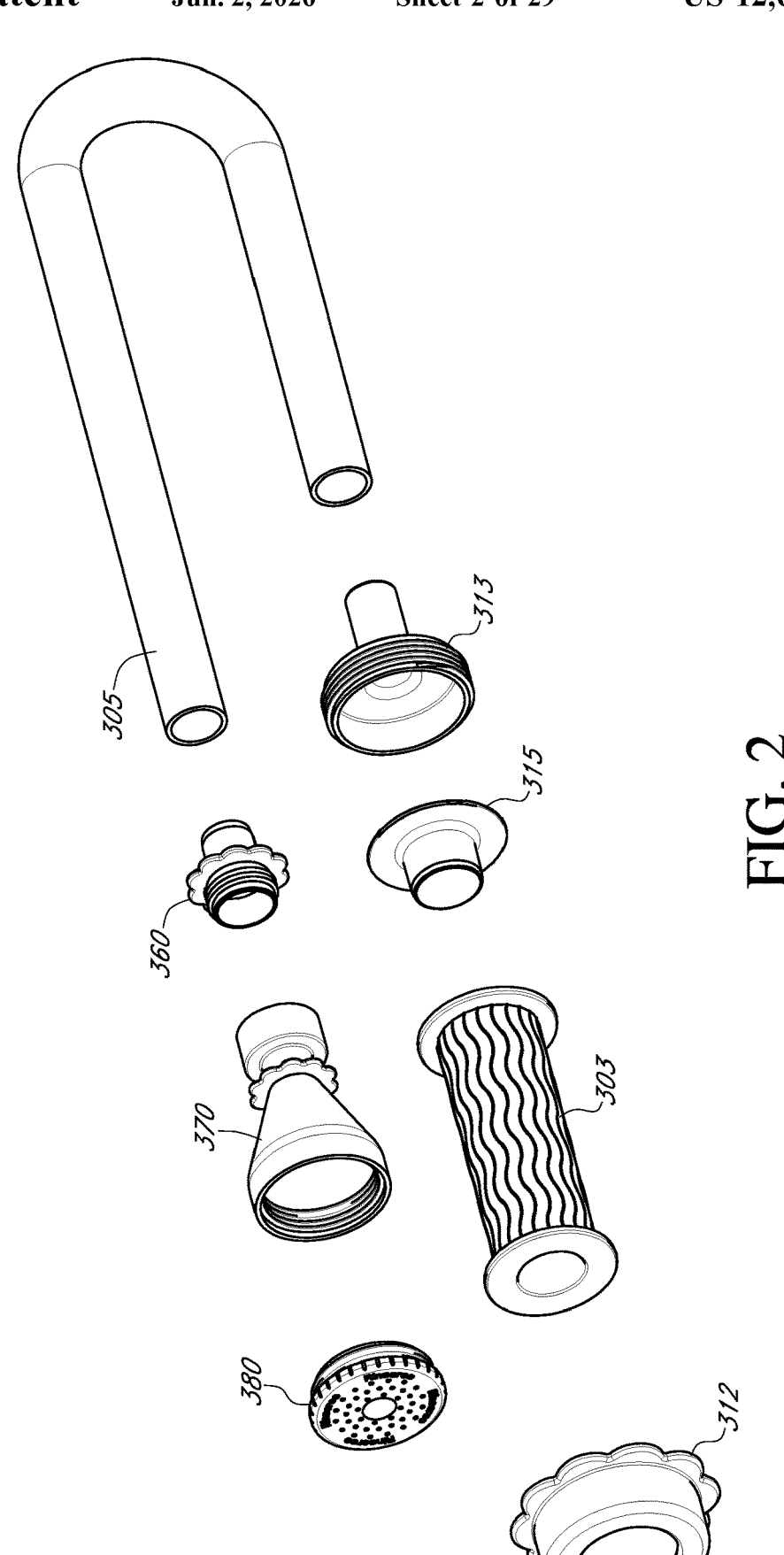
FIG. 2 is an exploded view of an embodiment of a high pressure converter hose comprising the connector assembly and sprayer hose assembly herein.

In some aspects, the distal end of the connector has a female coupler 312 as shown in FIGS. 2 and 5, and the first end of the hose has a male coupler 313 as shown in FIGS. 2 and 6, or the distal end of the connector has a male coupler and the first end of the hose has a female coupler. In some aspects, the male or female coupler may be secured to the connector or hose, such as by a clamp or glue or other securing means.

The high pressure converter hose may be manufactured in a variety of ways including but not limited to injection molding or extrusion. In some aspects, the high pressure converter hose may be manufactured in a single contiguous piece where both the connector and hose are comprised of similar material, but may allow for additional attachments to the distal hose end. In some aspects, the high pressure converter hose may be manufactured using different material for the connector and hose. In some aspects, the high pressure converter hose comprises at least two pieces. For example, the connector may be permanently or removeably attached, molded, clamped or screwed on to the hose component with or without male and female coupling members. In some aspects, coupling members may have corresponding parts such that one coupling member on the distal end of the connector may connect to a corresponding coupling member secured to the opening of the hose so that the connector may be removed from the hose. For example the coupling member of the connector and the hose may be threaded, coupled, or may snap or slide together in place.

The terms "high flow rate fixture" is meant to include various household fixtures that dispense a liquid at unrestricted higher flow rates, such as over 4 GPM and over the maximum GPM of typical household bathroom basin faucets, kitchen sink faucets or shower heads, and more than low or medium flow rates of tub spouts or hose bibs. High flow rate fixtures may include tub spouts or tub fillers that can run at about 5-8 GPM or more when fully opened, and hose bibs that can run at about 8-10 GPM fully opened with a typical residential water pressure of 50-60 psi. Tub spouts come in a variety of sizes and shapes. Some typical household tub spouts screw on to a ½" copper pipe or a ¾" steel pipe generally coming from a wall, or in some cases the floor. Tub spouts usually curve down or at least contain an opening through which water can flow in a downward direction into a tub. A standard tub spout may have a curved neck and generally may terminate in a square, round or rectangular opening. In some aspects, the tub spout may have an terminal outer opening that may be a round 1.5" or 2.5" diameter, or a 1" square opening, or may be a waterfall type spout having a rectangular opening, such as one measuring approximately 2" by 1.5". A tub spout may have a diverter valve proximate the opening and the connector herein is sufficiently flexible to stretch over a diverter if present. In some aspects, a hose bib may include, for example, a faucet on the outside of a home or in a utility room that dispenses water without any water flow restriction and thus the water flows at similar flow rates as through a tub spout. In some aspects, a hose bib includes a valve, which is commonly a compression type, where a handle rotates to screw the stem or spindle into the seat, thus sealing the opening and stopping the water flow. Hose bibs can attach, for example, to a garden hose or washing machine hose. Residential hose bibs are generally standard sizes such as ones having a ½" or ¾" diameter.

A single connecter herein is sufficiently versatile to accommodate both tub spouts and hose bibs and other household fixtures that do not have restricted water flow and has properties and dimensions such that it can remain attached even when the valve is fully open, even without gradually increasing the water flow.

FIGS. 1-15 illustrate exemplary embodiments of the high pressure converter hose and aspects of the connector 303, coupler/compression fitting 317 (the combination of 312, 315 and 313), hose 305 and spray head assembly 318 (the combination of 360, 370 and 380). FIG. 1 shows an embodiment of an assembled high pressure converter hose and FIG. 2 shows an exploded view of the same high pressure converter hose. The connector 303 has a proximal end and a distal end, wherein the proximal end may be passed through and beyond a first opening of the female cap 312 when assembled.

Figure 3A:
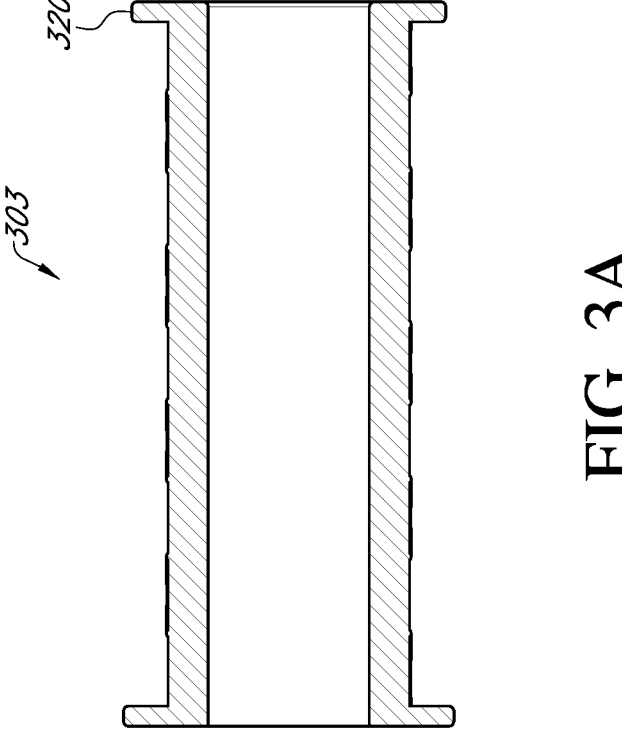
FIGS. 3*a*-3*c* are collectively a multiview view including orthogonal views of an embodiment of an elastomeric connector (not drawn to scale).
Figure 3C:
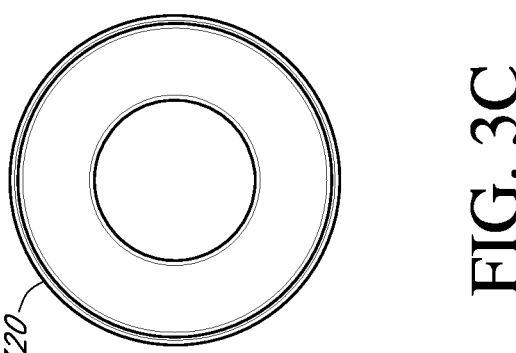
Figure 3B:
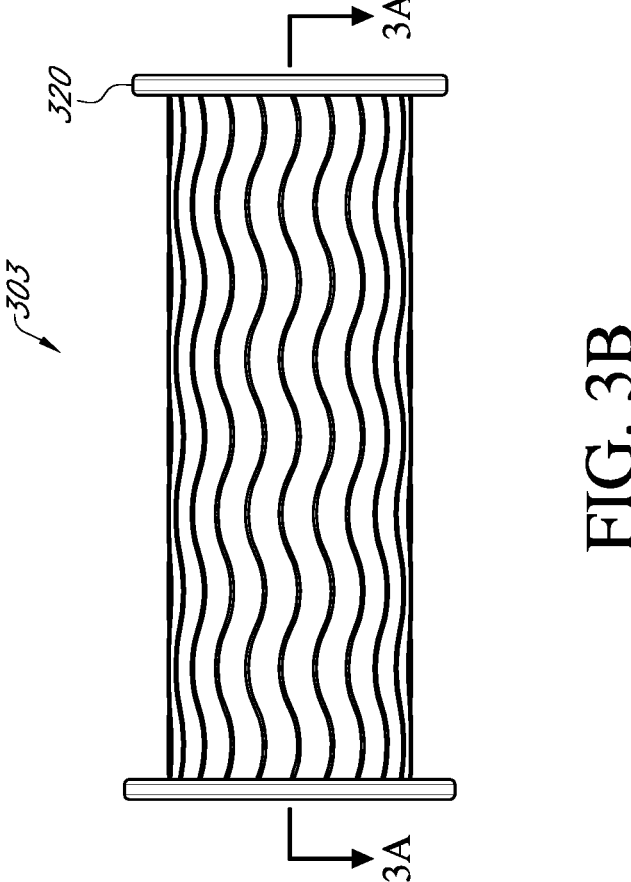

The elastomeric connector in more detail as in FIG. 3 may comprise an approximately perpendicular flange ("connector flange") 320 at a distal end thereof and an opening therethrough. The connector flange 320 is larger than the first opening of the female cap 312 (FIG. 5), is sufficiently wide so that the connector flange 320 does not slip through the first opening, and can form a seal with the insert flange 341 when compressed and assembled.

The rigid compression fitting 317 when assembled may have an opening aligned with the opening of the elastomeric connector 303 so that a fluid may pass through the high pressure converter hose unobstructed. The components of the rigid compression fitting 317 and the spray head 318 may be made from acrylonitrile butadiene styrene (ABS) plastic or another rigid material such as polycarbonate, acrylonitrile styrene acrylate (ASA), cellulose acetate, cellulose acetate butyrate, cellulose propionate, chlorinated polyvinyl chloride, high density polyethylene, high impact polystyrene, ethylene chlorotrifluoroethylene, ethylene tetrafluoroethylene, ethylene-methyl acrylate copolymer, styrene acrylonitrile, or mixtures or copolymers thereof that have an appropriate hardness to function as described herein. In some aspects, the rigid compression fitting 317 and the spray head 318 have a durometer hardness Shore Type D value measured according to ASTM D2240 for 10 seconds at 23° C. of about 60-100 such as about 65-100, about 75-100 or about 80-100.

The rigid compression fitting 317 may comprise an insert 315 (FIG. 7), a female cap 312 (FIG. 5) and a double sided male component 313 (FIG. 6).

Figure 7B:
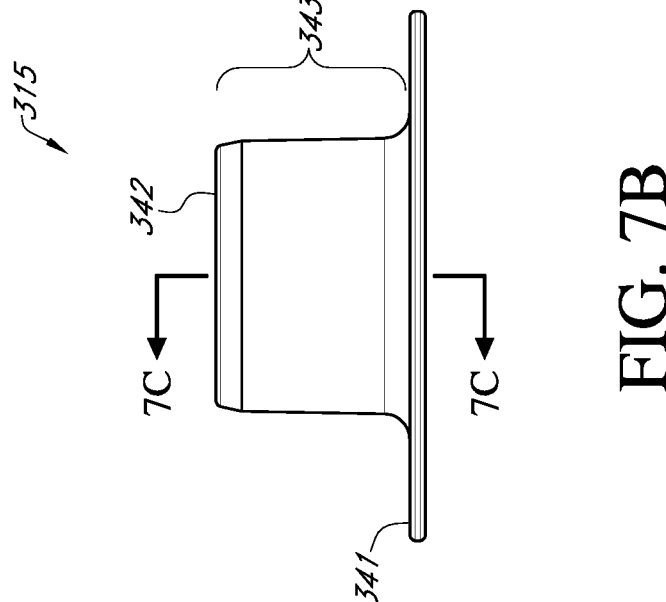
FIGS. 7*a*-7*c* are collectively a multiview view including orthogonal views of an embodiment of an insert (not drawn to scale).
Figure 7A:
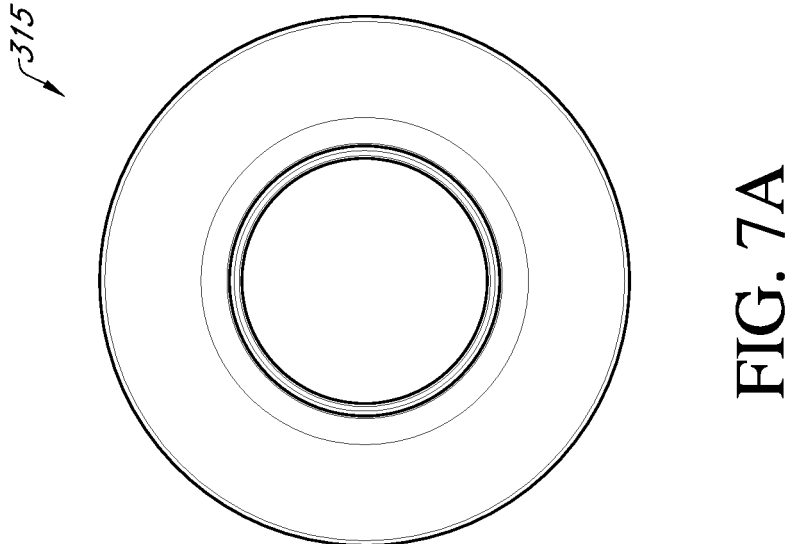
Figure 7C:
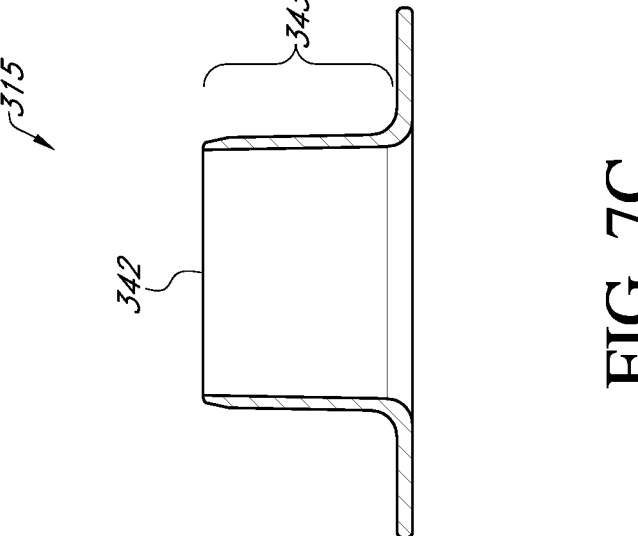
Figure 8B:
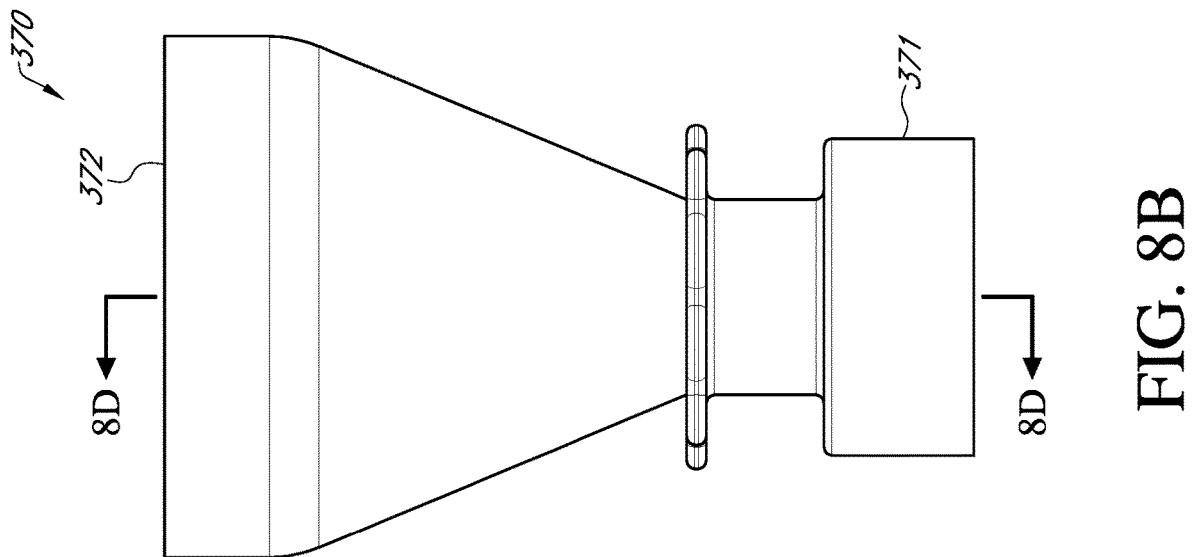
FIGS. 8*a*-8*e* are collectively a multiview view including orthogonal views of an embodiment of a spout (not drawn to scale).
Figure 8A:
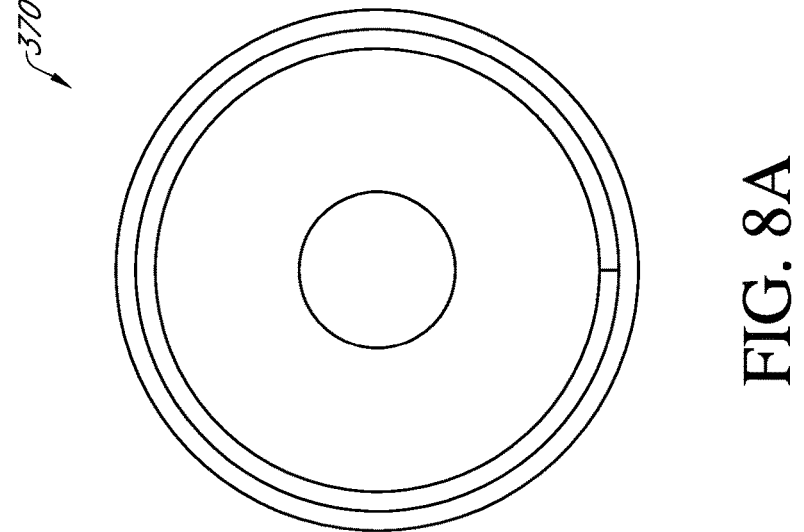
Figure 8D:
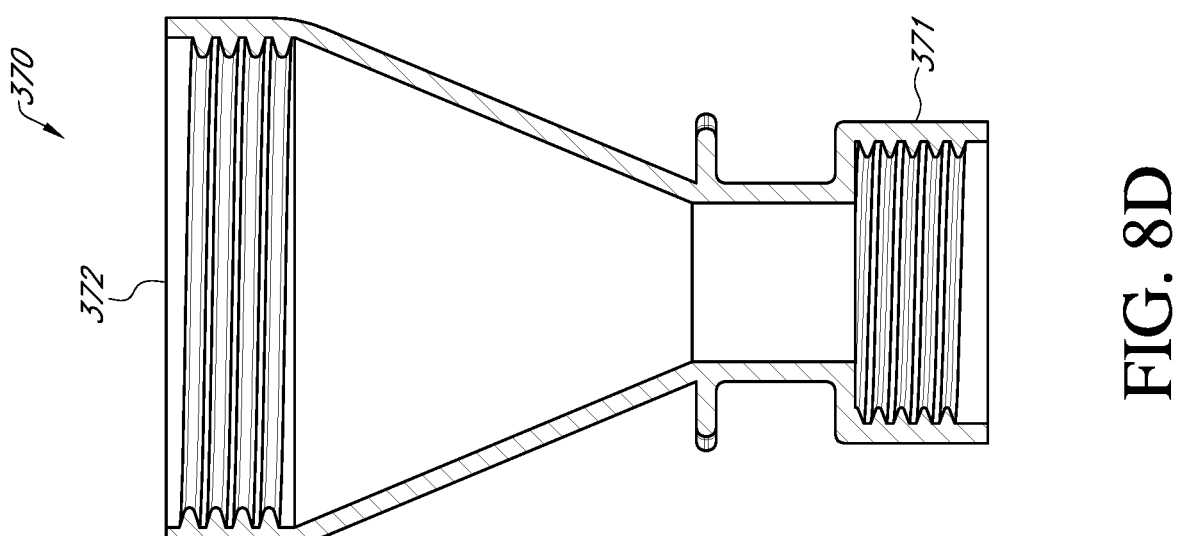
Figure 8C:
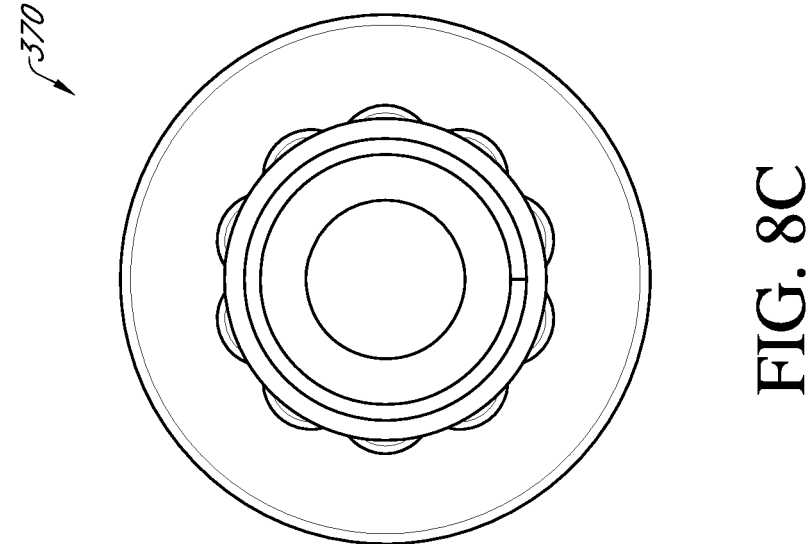
Figure 8E:
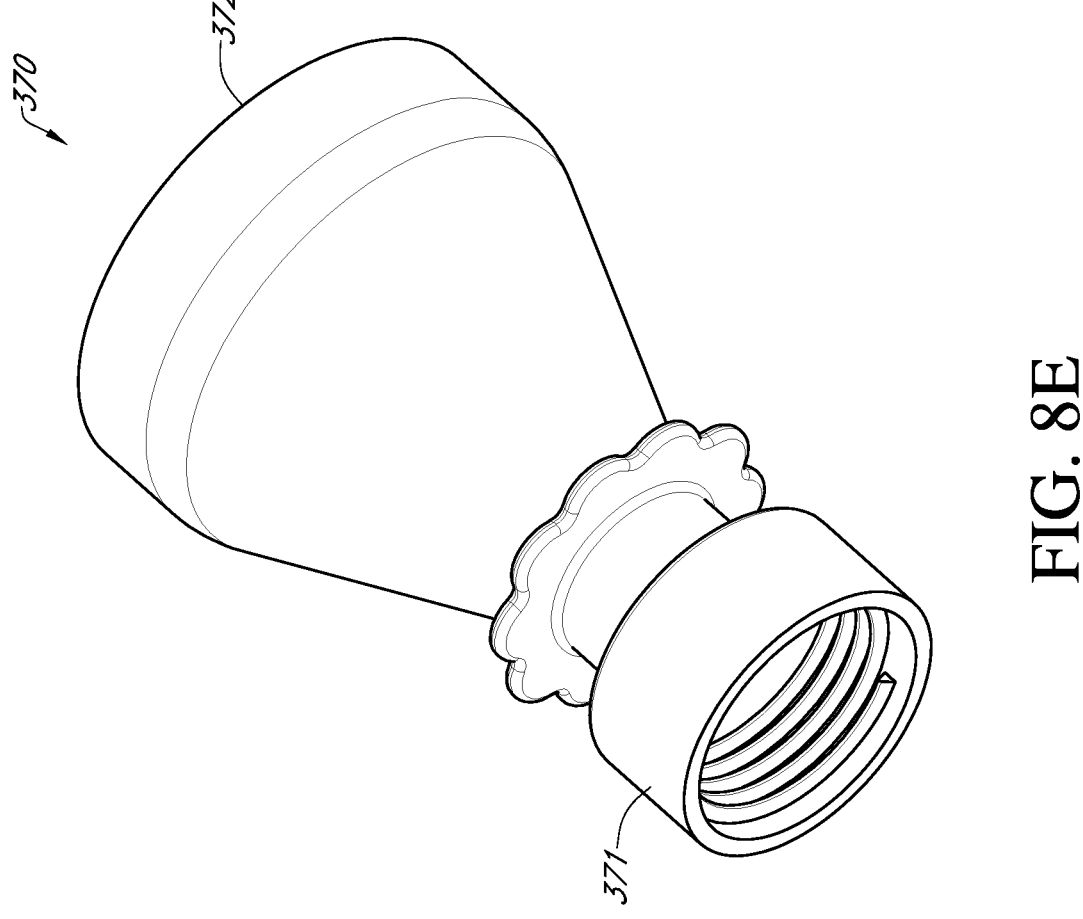
Figure 9B:
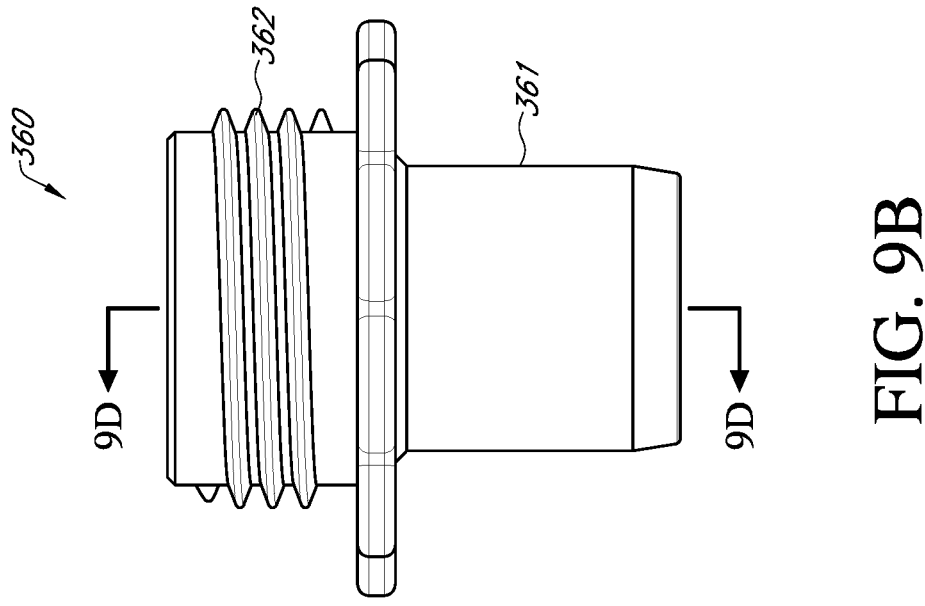
FIGS. 9*a*-9*e* are collectively a multiview view including orthogonal views of an embodiment of a threaded double-sided male component having a threaded end that connects to a standard female end of a garden hose, or the female end of a sprayer head, and an unthreaded end that can be inserted into the hose.
Figure 9A:
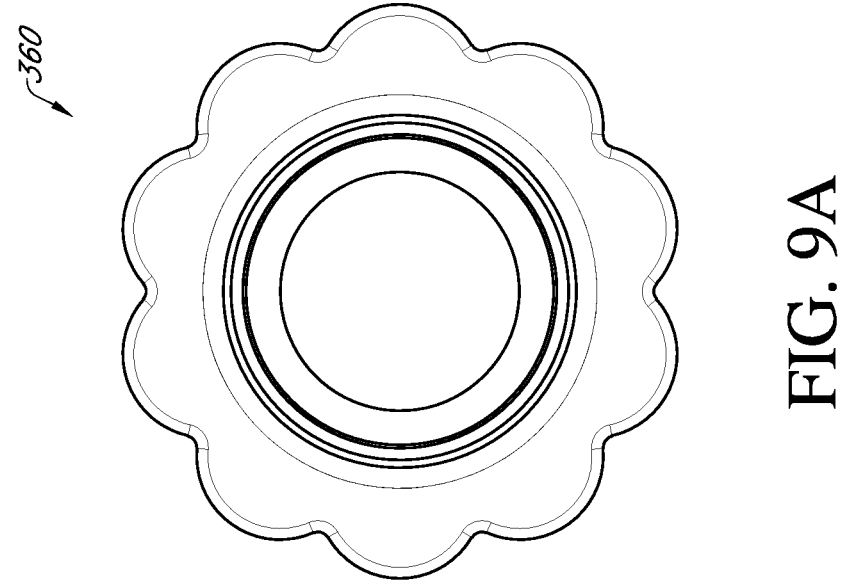
Figure 9D:
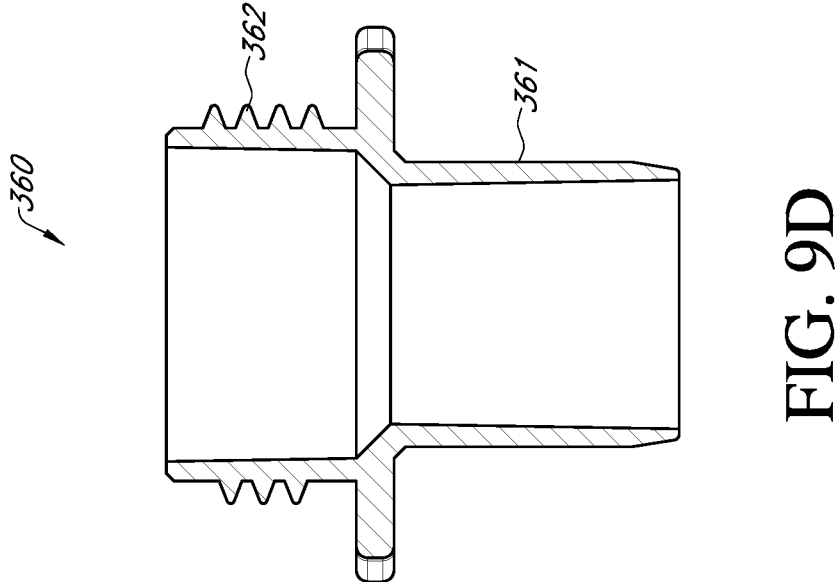
Figure 9C:
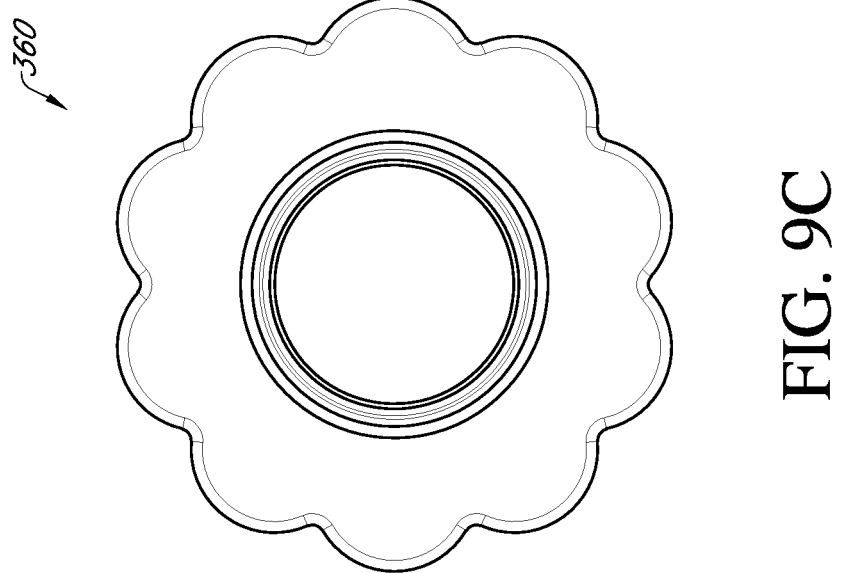
Figure 9E:
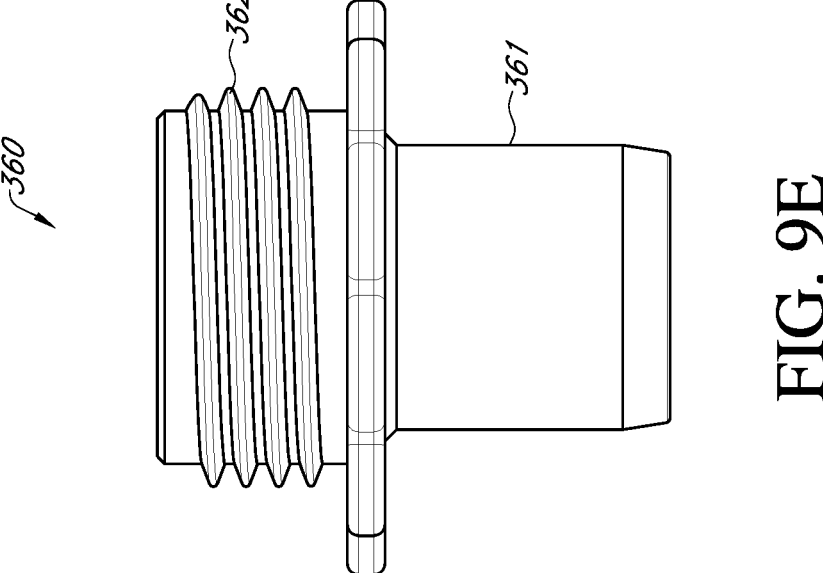
Figure 10B:
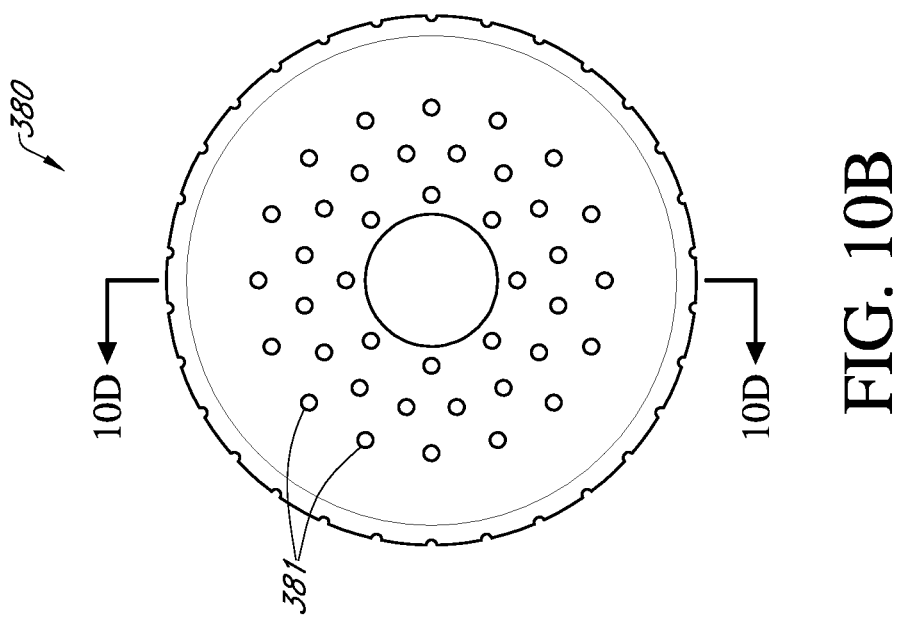
FIGS. 10*a*-10*e* are collectively a multiview view including orthogonal views of an embodiment of a spout plate, that in combination with the spout of FIGS. 8*a*-8*e* form a sprayer head assembly (not drawn to scale).
Figure 10A:
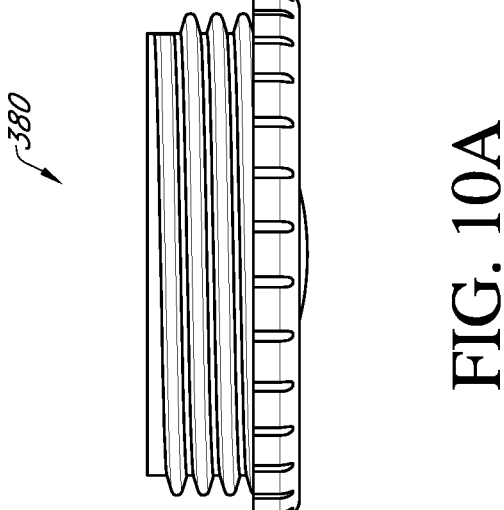
Figure 10D:
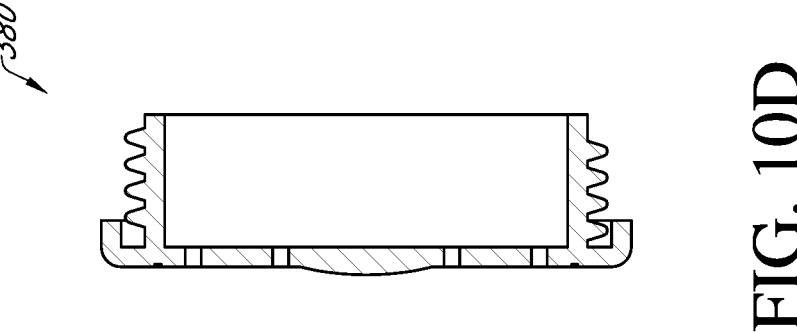
Figure 10C:
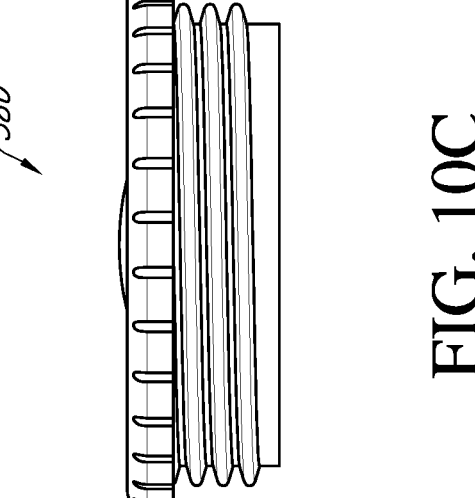
Figure 10E:
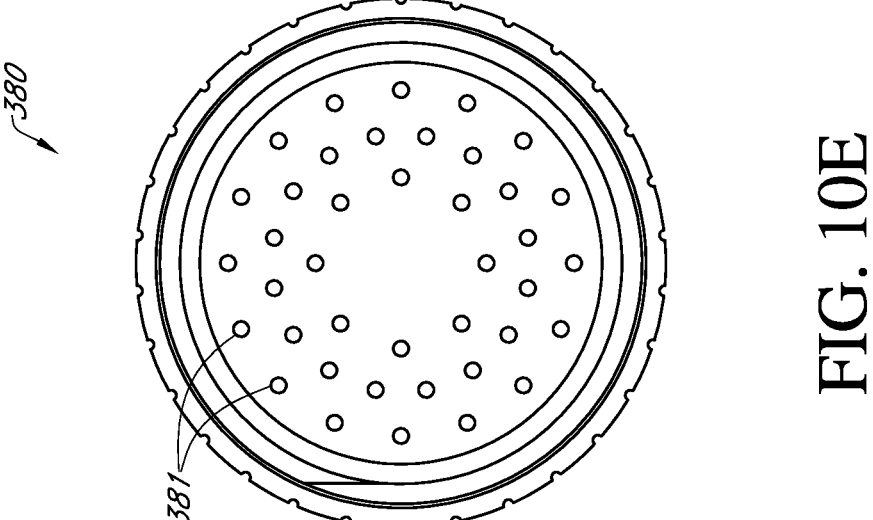

The insert 315 has a first end having an approximately perpendicular flange ("insert flange") 341 that has about the same dimensions or circumference as the connector flange 320 and a second end having tube 343 with a length (measured between the openings) that is shorter than a length of the elastomeric connector 303 and dimensions or a circumference that are about the same as the inner dimensions or circumference of a cross section of the distal end 311 of elastomeric connector 303 in its resting state. For example, the height (as measured from one opening to the other) of the insert 315 is about 5-20% the length of the connector 303, such as about 15-20% or about 17%. In some aspects when assembled, the insert 315 may be of a sufficient height to prevent the distal end of the connector 303 from collapsing when in use. For instance, when the second end 342 of the tube 343 is inserted into the distal end of the connector 303, the tube 343 may extend through and beyond the rim of the female cap 312. For example, the height of the insert 315 may be about 0.4-1", for example, about 0.8" or ¹³⁄₁₆" for a 4-6 inch length connector 303, such as ¹³⁄₁₆" for a 4.5" length connector. In this example, the combined height of the rim, connector flange 320 and insert flange 341 may be less than 0.4-1" such as about 0.6-0.9 inches for a 0.8" inch high insert. In some aspects, the tube 343 and insert flange 341 form a single integral insert as shown in FIG. 7.

Figure 13:
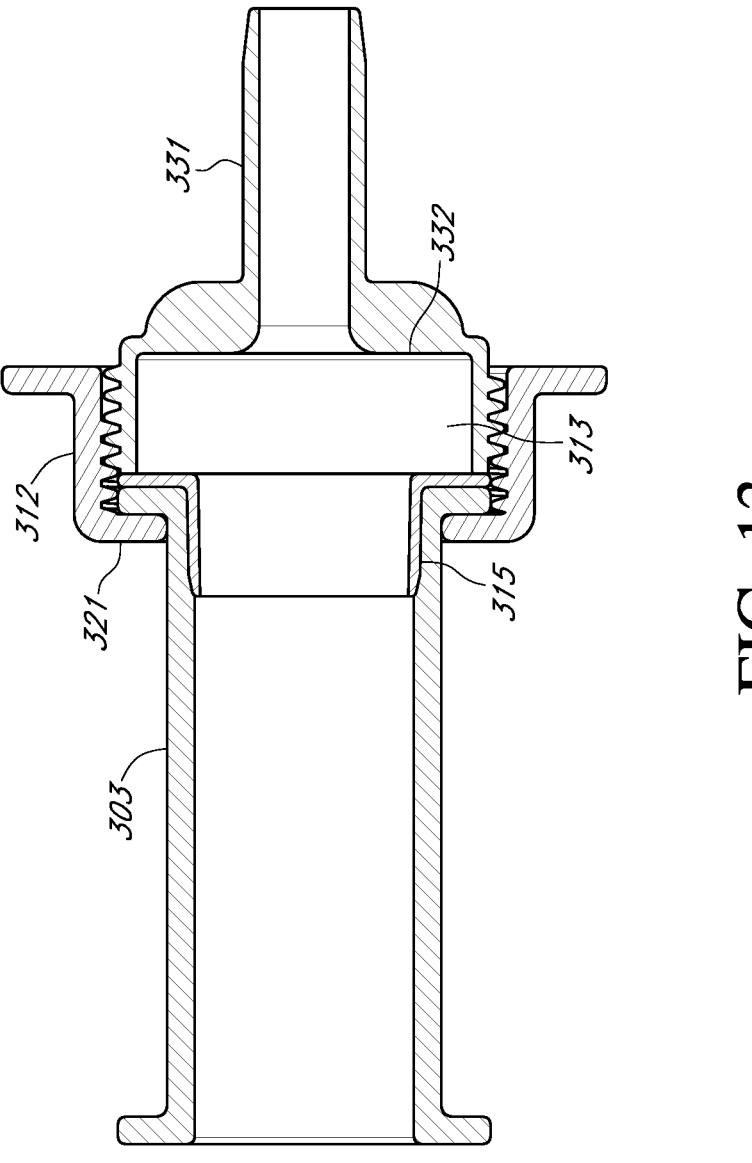
FIG. 13 is an embodiment of an elastomeric cover attached to the connector assembly.

In some aspects, the insert 315 and elastomeric connector 303 may be manufactured so that the insert is at least partially embedded within the elastomeric connector as shown in FIG. 13. For instance, at least some of the insert flange 341 is covered on both sides with the elastomeric material of the connector flange 320. In this case the insert flange 341 may have a smaller diameter than the connector flange 320.

In some aspects, the insert flange 341 and the connector flange 320 are compressed together against the rim of the female cap 312 when assembled, which may prevent the connector from detaching, and in addition, when compressed, a seal is formed when assembled, which may prevent leakage from the point of coupling when the high pressure converter hose having the connector assembly 317 is in use. Thus, the insert flange 341 and the connector flange 320 may be of a sufficient size so that the connector flange 320 can be securely held in place by the insert flange 341 to prevent the connector flange 320 from detaching when water flows through either the high pressure converter hose or the connector assembly 317. In addition, in some aspects, the insert flange 341 provides sufficient surface area to compress against the connector flange 320. In some aspects, the insert flange 341 and the connector flange 320 may be about the same size and both can fit inside the internal outermost edges of the female cap 312. Thus, the insert flange 341 has smaller dimensions (e.g., diameter, circumference) than the second opening 323 of the female cap 312 so it may fit inside. Therefore, the insert flange 341 may have a size and dimension that allows passage through the second opening 323 but not the first opening 322 of the female cap 312. In addition, a gap between the tube 343 and the rim may allow the connector 303 to fit within the space when assembled. In some aspects, the gap is approximately the size and shape of the connector flange 320 (FIG. 3).

As discussed above and as shown in FIG. 5, the female cap 312 comprises a rim 321 that may form a first opening 322 having a smaller circumference than the insert flange 341, and a second opening 323 having a larger circumference than the insert flange 341. The first opening 322 may have approximately the same dimension as the cross sectional outer circumference of the elastomeric connector 303 at the distal end thereof when in a resting state. The first opening 322 also may have a smaller circumference than the circumference of the insert flange 341 (e.g., shown in FIG. 7a) and a larger outer circumference than an outer circumference of the tube 343. When "circumference" is used comparatively, the cross sections where the parts meet or portions referenced are approximately similarly shaped (e.g., round, square or rectangular) so the parts fit together in a way that the connector assembly functions as intended. For example, if the cylindrical elastomeric connector 303 has an outer diameter at its widest part (not including any flange portion) of about 0.5-10 inches, for example 1" to 10", 1" to 8", 2" to 5", 2" to 3", 1" to 3", or 1" to 2" such as about 1.5 inches, then the diameter of the first opening 322 of the female cap 312 has about the same diameter, and thus the same circumference. A cuboid shaped connector may have the same dimensions, such as a cross section having a length and width, and therefore circumference, as a rectangular first opening having a similar length and width. In this example, the insert tube 343 would also have a shape and dimensions to fit inside the connector. Thus, the connector 303 can fit through the opening and extend outside the female cap 312 with no gap (which includes a minimal gap that does not interfere with the functioning of the high pressure converter hose) between the rim and the distal end of the connector. The connector flange 320 may remain inside the female cap 312 against the rim when assembled.

The second opening on the female cap 312 may receive a complementary male end 330. In some aspects, both the female cap 312 and the complementary male end 330 are threaded and can be coupled to form a tight closure. Other closures are also contemplated such as a cam and follower, a snap, a slide or other closure that can compress the complementary male end 330 against the insert flange 341, connector flange 320 and rim 321 of the female cap 312 when assembled. The closure allows the connector flange 320 on the distal end of the connector 303 to stay connected to the compression fitting 317 without readily detaching from the compression fitting 317 when attached to a fixture or when in use as a high pressure converter hose.

Figure 5B:
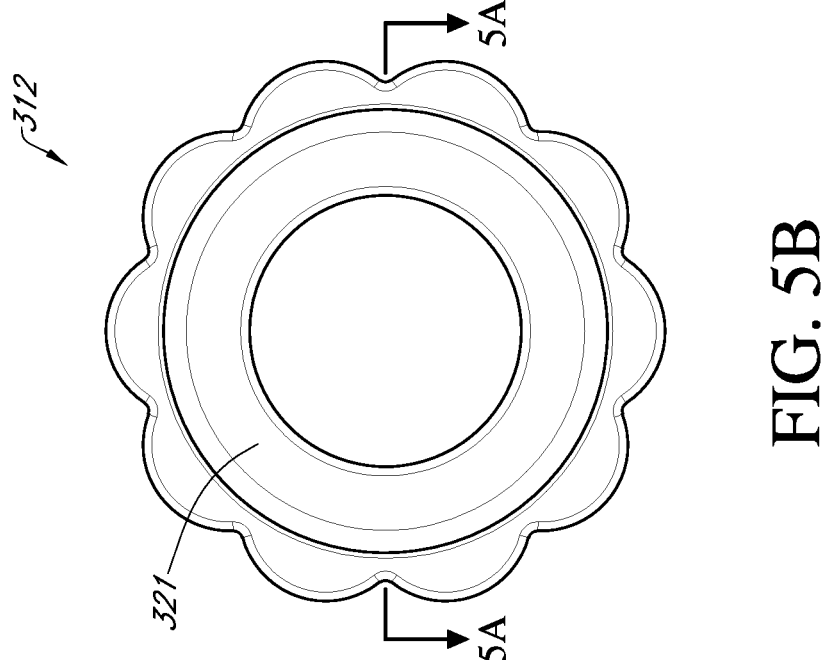
FIGS. 5*a*-5*e* are collectively a multiview view including orthogonal views of an embodiment of a female cap (not drawn to scale).
Figure 5A:
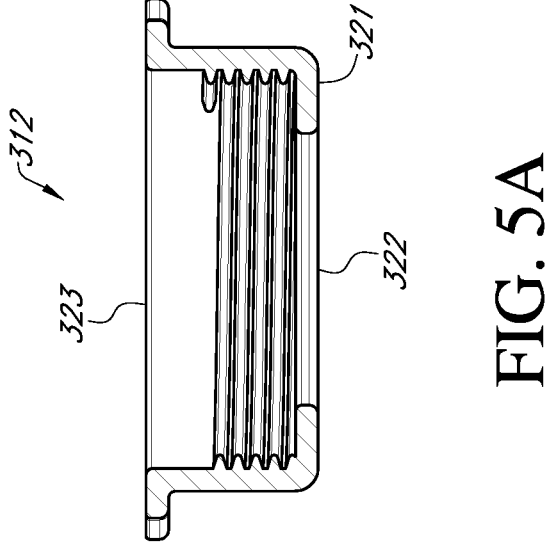
Figure 5D:
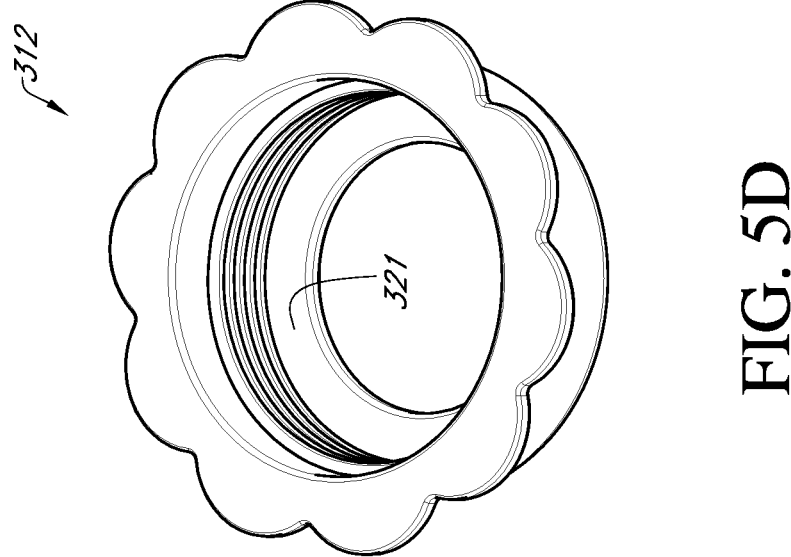
Figure 5C:
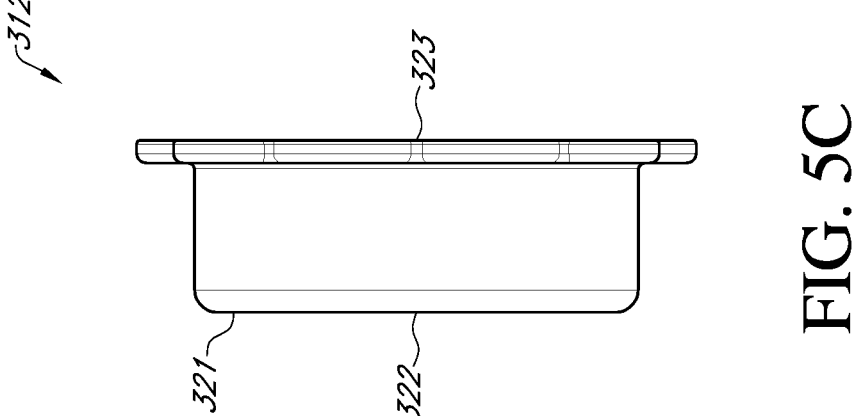
Figure 5E:
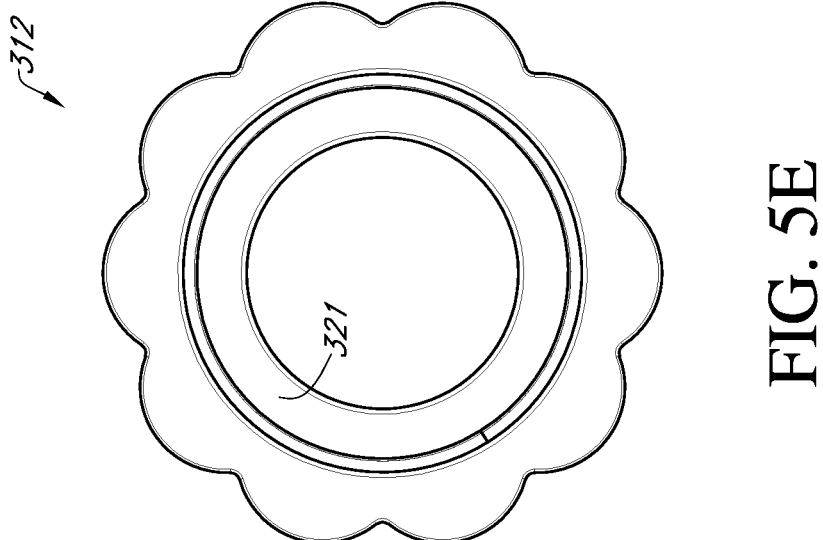

In some aspects, the height of the female cap 312 (the distance between the outside of the rim 321 and the entrance to the second opening 323, see FIG. 5c) is sufficient to accommodate the insert flange 341, connector flange 320, and complementary male end 330. The height of the female cap 312 depends on the dimension of the components that will be inserted therein and the dimension of the remainder of the components, and may have a height of about ¼" to 5", ½ to 3", ⅝" to 1", or ¾" to ⅞". The second opening 323 may have larger dimensions than the first opening 322. A cylindrical second opening 323, for example, may have a diameter of about 0.5-12 inches, for example 1-10, 1-8, 1-5, 1-3, 1.5-2.5, 2-2.5 inches or about 2.2" or 2.25". See FIG. 5e.

In some aspects, the compression fitting 317 further comprises a double sided male component 313, for example in FIG. 6. One male end may be complementary to the female cap ("complementary male end") 330 and a second male end may insert into or attach to a hose ("male hose end") 331 and positioned opposite the complementary male end 330. In some aspects, if the connector 303 is larger than the hose 305, between both ends may be a transition plane/portion 332 between a larger opening of the complementary male end 330 and a smaller opening in the male hose end 331. The double sided male component 313 may be integral with the insert flange, or may be separate components (e.g., FIG. 6-7).

The larger opening on the complementary male end 330 of the double sided male component 313 may have dimensions that are slightly smaller than the second opening of the female cap 312 but of sufficient size or dimension to engage the female cap 312. The larger opening, for example, may have a diameter of about 0.5-12 inches, for example 1-10, 1-8, 1-5, 1-3, or 1.9-2.5 inches such as about 2". See FIG. 6a.

In some aspects, the height (FIG. 6d) of the complementary male end 330 may have dimensions that have a sufficient size to engage the female cap 312. The height of the complementary male end 330, for example, may be about as ⅛" to 4.5", ¼" to 3", ¼" to 2", ¼" to 1", ½" to ¾" or ¾".

The outer dimensions of the male hose end 331 may have circumferences or diameters that are similar to the inner circumference or diameter of the hose 305. In some aspects, when engaging a typical cylindrical hose, the outer diameter of the male hose end 331 may be about 0.6" to 3", 0.75" to 1.5", 0.75 to 1", 0.5" to 3", 0.5" to 2", 0.5" to 1", 0.6" to 1 or about 0.6", 0.7", or ¾" outer diameter. In some aspects, a hose with an oblong cross section, or other shaped cross section, is sufficiently flexible to fit on a male hose end with a round cross section.

In some aspects, when engaging a typical cylindrical hose, the inner diameter of the male hose end 331 may be about 0.6" to 3", 0.75" to 1.5", 0.75 to 1", 0.5" to 3", 0.5" to 2", 0.5" to 1", 0.6" to 1", such as about 0.6", 0.7", or ¾", or about a 0.6", 0.625" (⅝") inner diameter. In some aspects, the male hose end 331 is threaded and fits a standard garden hose wherein the outer diameter is about 1¹⁄₁₆" (i.e., 1.0625" for a ¾" standard male garden hose fitting), and the inner diameter is ¾", which is suitable for attaching to the female end of a standard garden hose such as a garden hose having a ¾" inner diameter (see FIGS. 6e and 6f). The wall thickness for the garden hose fitting may be about ⁵⁄₃₂". Using the proportions outlined herein, additional dimensions for the opening in the male hose end for particular applications can be easily calculated. Likewise, circumferences may be easily calculated as well.

In some aspects, the wall thickness of the male hose end may about ¹⁄₃₂" to ½" thick such as about ¹⁄₁₆" to ¼" thick, for example, about ¹⁄₁₆", ⅛", ³⁄₁₆" or ¼" such as ⅛" thickness. Using the proportions outlined herein related to the inner dimensions of the male hose end and wall thicknesses, additional dimensions such as the outer dimensions for the male hose end for particular applications can be easily calculated.

Figure 6B:
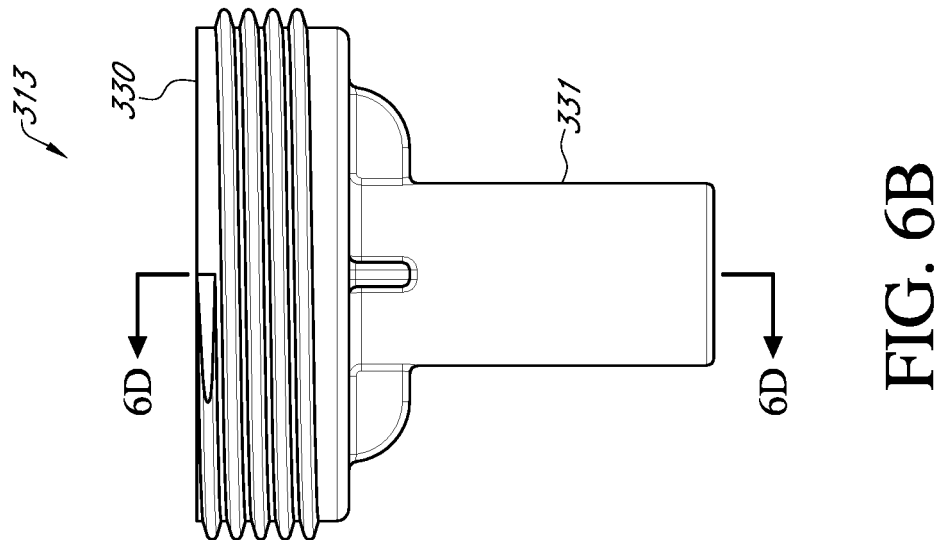
FIGS. 6*a*-6*g* are collectively multiview views including orthogonal views of embodiments of double-sided male components.
Figure 6A:
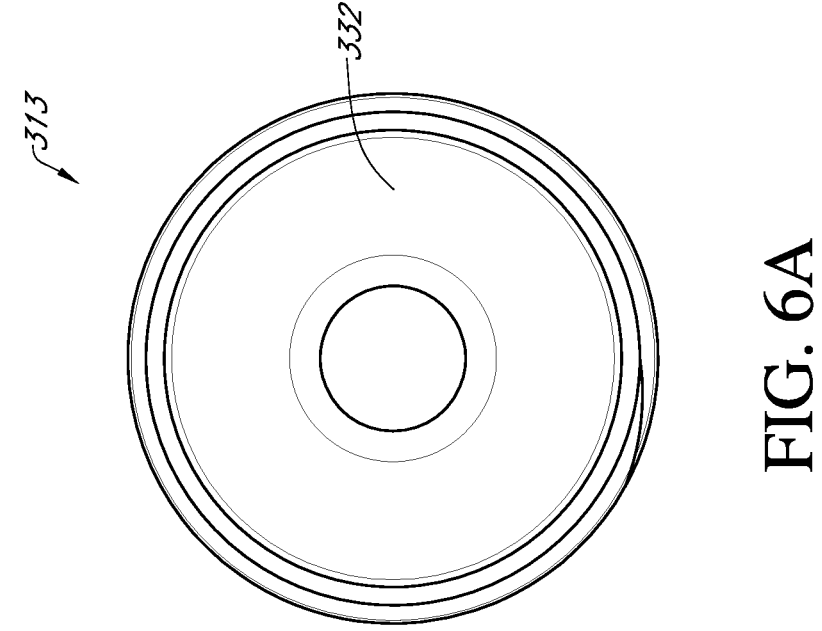
Figure 6D:
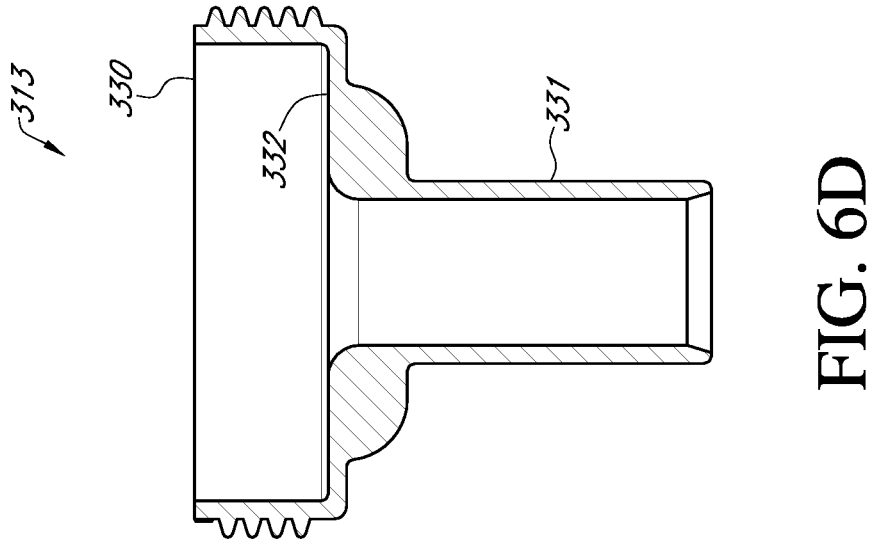
Figure 6C:
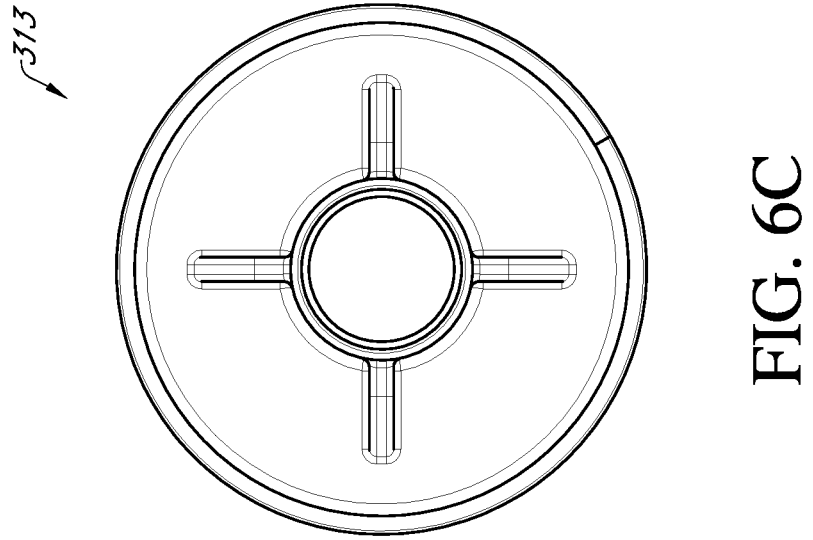
Figure 6E:
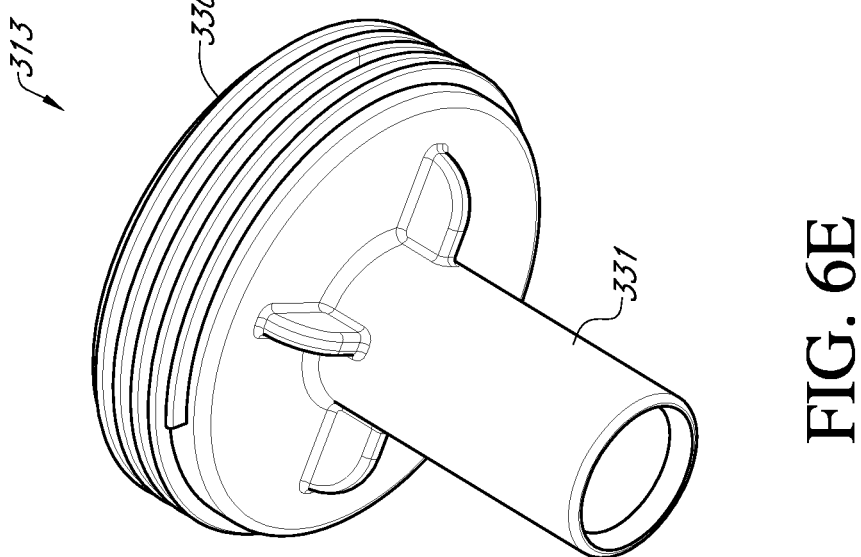
Figure 6G:
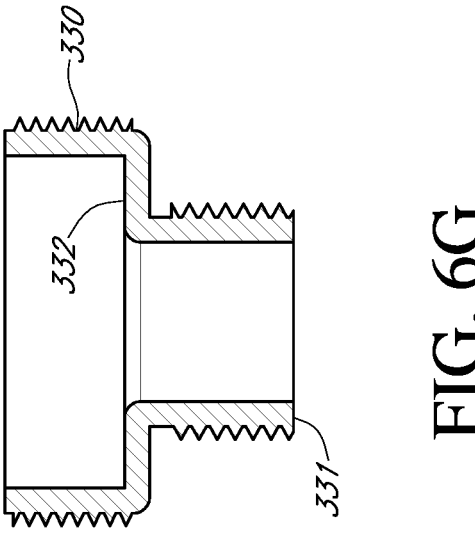
Figure 6F:
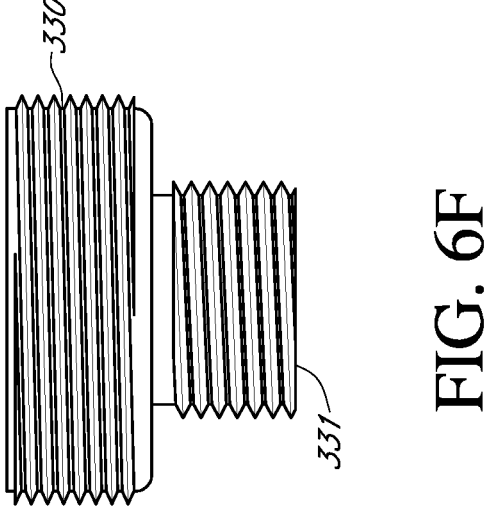

The male hose end 331 may have a sufficient length to engage the hose 305 and form a seal. The end of the male hose end 331 that is inserted into or affixed to the hose may be tapered to ease insertion therein or untapered (FIG. 6c). The length of the male hose end 331 depends on the size and material of the hose, and the size of the compression fitting. In some aspects, when engaging a hose, the length of male hose end 331 may be about ½" to 4", ½" to 3", ½" to 3", 1.75" to 2.5", or about 2-2.25" in length.

In some aspects, the high pressure converter hose further comprises a hollow nozzle coupled to a second end of the hose. In some aspects, a nozzle can act as a hose extension connector to add at least one length of hose to the high pressure converter hose to make it longer. Thus, the hose could be extended to make a longer hose without manufacturing additional parts to connect additional hoses. In some aspects, the nozzle has an insert end, a center portion and a nozzle end. The insert end nozzle end may be interchangeable.

In some aspects, the edges of the complementary male end 330 may compress the insert flange 341 and the connector flange 320 against the rim 321 of the female cap when assembled. In some aspects, when the insert flange 341 is at least partially or fully embedded in the connector flange 320, both the complementary male end 330 and the rim 321 of the female cap will come in contact with the connector flange 320 having the insert flange 341 that is sandwiched inside the connector flange 320. In some embodiments, embedding the insert in the elastomeric connecter will further prevent the connector from detaching from the connector assembly when in use.

Typically, the components herein have cylindrical openings or are made to accommodate a cylindrical connector and hose 305 as shown in the figures; however, other shapes are not precluded and the high pressure converter hose may be customized to complement particularly shaped or sized fixtures. Generally, due to the elastomeric nature of the connector, a cylindrical connector can accommodate various shaped fixtures such as those that are round, square, rectangular, hexagonal, and can fit over entire fixtures such as outdoor hose bibs including the wheel handle, and bathtub faucets including the drain stopper, for example. Nonetheless, other shaped connectors are contemplated, for example, such as cuboid, cube, cone/funnel, prism, or pyramid shaped connectors having openings on both ends, or for instance any shape having a round, square, triangular, rectangular, hexagonal or multi-sided cross section. Connector shapes need not be symmetrical and can include an asymmetrical hourglass, wavy, or custom shape, which could be similarly beneficial in particular applications. The compression fittings and hose may also match the shape of the connector. In some aspects a cone shaped connector may have one end that fits into the compression fitting and broadens to accommodate a larger fixture than a cylindrical hose, such as a large diameter shower head or a rain shower head.

The rigidity of the hose 305 may be one factor for the hose 305 to function effectively without collapsing. In some aspects, the hose 305 is made from a material that is more rigid than the connector. In some aspects, the hose 305 is less rigid than the compression fitting 317. For example, hose material may have a durometer hardness Shore Type A value measured according to ASTM D2240 for 10 seconds at 23° C. of about 55-100 such as about 60-100, about 60-80 or about 60-70, for example, about 65. In some aspects, the hose 305 is reinforced, for example with a polyester braid, spiral reinforcements, or ribbing. A reinforced hose may be further covered in a protective layer. Typical garden hose materials include plasticized polyvinyl chloride (PVC), rubber or polyurethane. Hoses are widely available commercially and can be selected based on use.

Figure 4B:
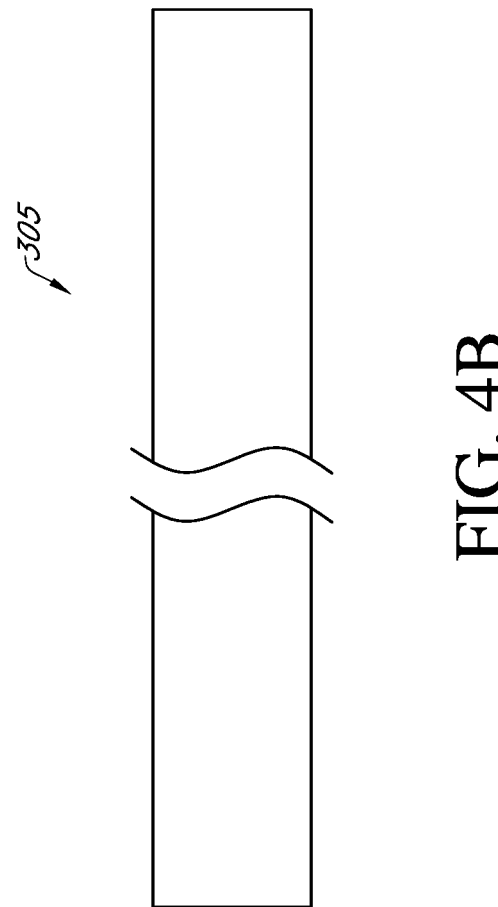
FIGS. 4*a*-4*b* include orthogonal views of an embodiment of a hose (not drawn to scale).
Figure 4A:
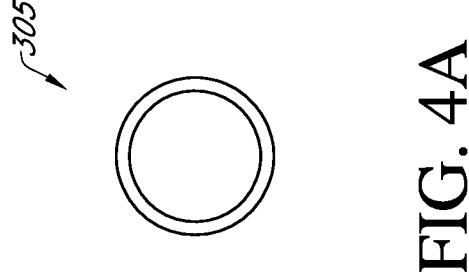

In some aspects, the wall thickness also may be a factor in providing a hose 305 that will not collapse. A hose material may be selected based on a combination of durometer hardness and wall thickness to arrive at an effective high pressure converter hose herein. For example, a hose 305 with a relatively thinner wall may comprise a material with a higher Shore Type A durometer hardness, while a thicker wall may comprise a material with a lower Shore Type A durometer hardness. Many hoses are made of a combination of an inner flexible tube that is strengthened with a reinforcing layer and covered in a protective layer. In some aspects, the hose 305 may have a wall thickness of about 0.01-1.5" such as about 0.02-0.8", about 0.05-0.8", about 0.05-0.5", about 0.08-0.3", or about 0.09-0.2", for example, about 0.1" or about 0.2". In some aspects, the hose 305 may have a wall thickness of about ⅓₂" to ½" thick such as about 1/16" to ¼" thick, for example, about ⅓₂", 1/16", 3/32", ⅛", 5/32", 3/16", 7/32", ¼", 9/32", 5/16", 11/32", ⅜", 13/32", 7/16", 15/32", or ½", such as ⅛", or a range including any of these thicknesses. The inner dimensions such as the diameter of the hose 305 may also be a factor in providing a hose 305 that will not become detached (FIG. 4a, inner arrows). The inner dimensions such as the diameter also may influence the rate of flow. In some aspects, the inner dimensions such as the diameter are smaller than the dimensions such as the diameter of the larger opening of the complementary male end 330. In some aspects, in a typical cylindrical hose, the inner diameter may be about ⅛" to 5", ¼" to 3", ¼" to 2", or ¼" to 1", such as about ⅝" to 1", or about a ¾" inner diameter. The outer diameter of the hose 305 takes into account the wall thickness and may be about ¼" to 5", ¼" to 3", ¼" to 2", ¼" to 1", such as about ¾" to 1", about 0.9"-1" or about 0.9" outer diameter, or even larger such as ½" to 2½" or larger depending on the application (FIG. 4a, outer arrows).

The second end of the hose 305 may be connected to a spray head 318. In some aspects, the spray head 318, if present, may be made from a rigid material such as plastic or metal, and may have openings at both ends. In some aspects, the spray head 318 comprises a fitting 360 such as a fitting having a first fitting end 361, such as a first male fitting end, that fits inside or attaches to the second end of the hose, and has a second fitting end 362, such as a second male fitting end, which may be threaded or unthreaded, and which fits into the fitting end 371 of the spout 370, or a second hose, such as a garden hose threaded fitting that fits a standard garden hose, such as a male garden hose threaded fitting. In some aspects, fitting 360 may be about ½"-3" in length such as about 1-2", 1.25"-1.5", or about 1.35" in length. The width of the fitting 360 may depend on the size of the opening on the second end of the hose and may have corresponding sized openings. For example, the outer diameter of the opening may be about to ⅝" to 1", ⅝" to ⅞", ¾" to ⅞" such as about ¾" outer diameter, and about ½"-1" inner diameter such as about 7/16"-⅞" inner diameter, or larger such as ½" to 2½" or larger depending on the application. The thickness of the wall of the fitting may be about ⅓₂"-⅛" in diameter, such as about 1/16" thick.

The spray head 318 (FIG. 1) may comprise a spout 370 (FIG. 8) and a spout plate 380 (FIG. 10). The spout 370 may comprise a fitting end 371 having an opening therethrough on a first end thereof such as a female fitting, e.g., a female standard garden hose threaded fitting or a ¾" standard garden hose threaded fitting. An opening in the fitting end 371 may have about a ½"-1" inner diameter at the smallest opening such as about 7/16"-⅞" inner diameter, such as ⅝" or larger such as ½" to 2½" or larger depending on the application. For example a ¾" female garden hose fitting may have an internal diameter at its smallest opening therein of about 0.6".

The spout 370 (FIG. 8) may also form an opening on the second end thereof 372, which may be wider than the opening on the fitting end 371. In some aspects, the second end 372 thereof may be threaded such as having a female threaded end for accepting a threaded spout plate 380 (FIG. 10). An opening in the second end 372 may have about a 1"-4" inner or outer diameter such as about 1.5"-2.5" outer diameter, for example, a 2" outer diameter, or it may be larger depending on the application.

The spray head may be about 1"-4" in length such as 2"-3.5" such as about 3.1" in length from the fitting end 371 to the second end thereof 372.

The spout plate 380 (FIG. 9) may be of a corresponding size to be accepted into the second end 372 of the spout 370. For example, the spout plate 380 may have a diameter of about a 1"-4" inner or outer diameter such as about 1.5"-2.5" outer diameter, for example, a 2" outer diameter, or it may be larger depending on the application. The spout plate 380 may comprise a plurality of openings 381 (seen in FIGS. 10b and 10e) through which water may flow through to form a spray. The spout plate 380 may comprise a threaded portion such as a male threaded portion (seen in FIGS. 10a and 10c) to be accepted by a female threaded second end 372 of the spout. A washer (not shown) may be situated between the spout 370 and the spout plate 380 forming a seal therebetween.

In some aspects, the components of the high pressure converter hose, such as the connector, compression fitting, nozzle and hose, are easily detachable so that if one component became damaged or worn out, the high pressure converter hose could be disassembled and only the damaged component would need to be replaced.

The terms "approximately" "about" and "substantially" as used herein represent an amount close to the stated amount that still performs the desired function or achieves the desired result. For example, the terms "approximately," "about" and "substantially" may refer to an amount that is within less than 10% of, within less than 5% of, within less than 1% of, within less than 0.1% of, and within less than 0.01% of the stated amount.

All patents and publications referenced herein are incorporated herein by reference.

EXAMPLES

Example 1

A cylindrical connector was manufactured from TPE super elastic plastic made from a propriety blend comprising primarily about 75% Kraton™ G1651 H Polymer, a clear, linear copolymer based on styrene and ethylene/butylene with a polystyrene content of 33% and about 25% Kang Libo 15 #white oil cosmetic product, as well as other additives.

The connector had a Shore Type A value of 0 and Shore Type OO value of 40.

The connector was about 4.5" long, having an internal diameter of about 1" in its resting position and about a ¼" wall thickness. The distal end of the connector was produced with an approximately perpendicular and integral flange having a diameter of about 2.05". The outer diameter of the connector, not including the flange was about 1.5".

A compression fitting was manufactured from acrylonitrile butadiene styrene (ABS) plastic having 3 parts: an insert, a female cap and a male component. In addition, spray head components were also made from ABS.

The insert was manufactured with a flanged base having about a 2.05" diameter approximately perpendicularly (<91°) and integrally connected with an approximately 0.81" length tube measured from opening to opening having an internal diameter of about 0.95" and a wall thickness of about 0.06".

The female cap was manufactured having a height of about 0.83" with an approximately 2.2" diameter threaded opening on one end for accepting a male component, and a 1.5" diameter opening on the other end for accepting the connector. The female cap also comprised a decorative scalloped edge near the opening for receiving the male component.

A male component was manufactured with an approximately 2.125" height and a 2.03" diameter, having a threaded end about 0.55" height for inserting into and securing the female cap, and an approximately 1.5" long unthreaded tube portion having an approximately 0.6" internal diameter opening and appropriate corresponding dimensions for inserting into the hose.

The connector, female cap, insert, and double sided male component was assembled to form a high pressure connector assembly.

An approximately 5' long flexible hose comprising polyvinyl chloride (PVC) having an internal diameter of about ¾" and having a wall thickness of about ⅛" was manufactured. The hose was opaque and contained an outer layer, an inner layer and a reinforcing layer in between similar to a standard garden hose.

The proportion of the connector inner diameter to the hose inner diameter is about 1.33. The proportion of the inner diameter of the tube portion of the insert of about 0.95" to inner diameter of the untapered male end that inserts into the hose of 0.6" is about 1.6. The length of the tube of the insert of about 0.81" to length of a 4.5" connector is about 0.18.

The hose was attached to the high pressure connector assembly to make a high pressure converter hose as shown in FIGS. 1-8, which was attached to several faucets including:

a curved tub spout with an approximately 1.5" outer diameter round opening;

a standard tub spout that extends perpendicularly from the wall and curves to provide a downward flow of water and having an opening of approximately 1" square;

a tapered tub spout that extends perpendicularly from the wall and curves to provide a downward flow of water that has about a 2" outer diameter at a wider portion and that tapers to about a 1.5" outer diameter;

a tapered tub spout that extends perpendicularly from the wall and curves to provide a downward flow of water that has about a 2" outer diameter at the widest portion and that tapers to about a 1.25" square outer opening;

a tapered tub spout that extends perpendicularly from the wall and curves to provide a downward flow of water that has about a 2.75" outer diameter at the widest portion and that tapers to a spout having two sides that form a D shaped outer opening with a straight portion having an approximately 1.75" length outer side and the remaining half circle portion;

a rectangular tub spout measuring approximately 2" by 1.5" outer diameter; and a fixture with a 2.5" outer diameter spout.

In addition, the high pressure converter hose was attached to similar tub spouts having diverters either close to the opening or further back on the tub spout.

The valve was quickly opened fully on each tub spout without gradually increasing the water flow rate, or the diverter was used to get the highest possible water flow as fast as possible. The high pressure converter hose did not detach from the tub faucet and the connector did not leak.

The water also passed through the spray head without backing up.

Example 2

The same high pressure connector assembly was manufactured as in Example 1, except the male component was manufactured with a male tube portion that had dimensions similar to a standard ¾" male garden hose thread (MGHT) (standard male garden hose fitting) that is threaded with an outside diameter of about 1.0625 and has non tapered, parallel threads with 11.5" threads per inch, and about a 0.75" internal diameter. See FIG. 11.

A standard garden hose was attached to the high pressure connector assembly having the standard ¾" MGHT fitting on one end and a standard ¾" female garden hose thread (FGHT) fitting on the other end. In one aspect, a spray head as shown in FIGS. 8 and 10, having a standard ¾" female garden hose thread (FGHT) fitting was attached, and in another aspect, was not attached.

Figure 12B:
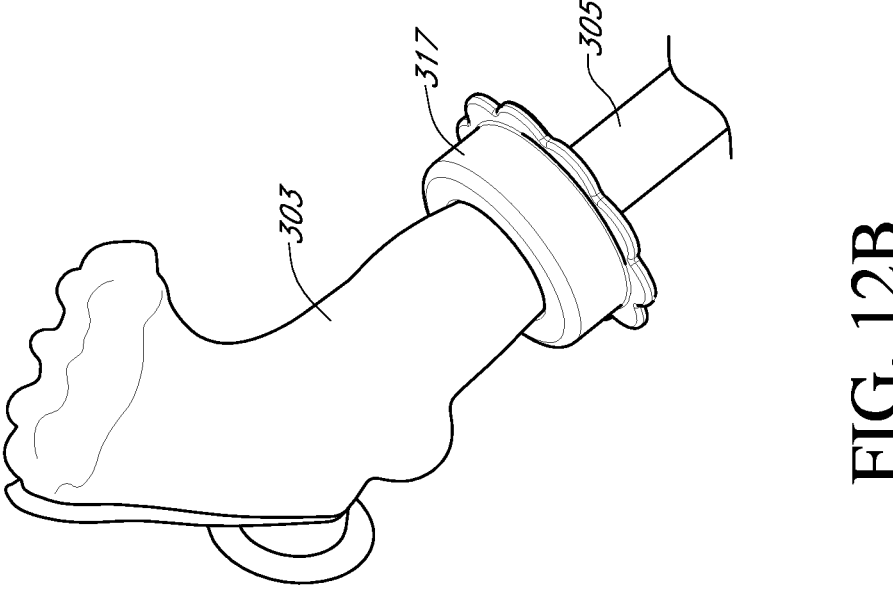
FIGS. 12*a*-*c* are embodiments of the high pressure connector assembly attached to a garden hose and affixed to a hose bib, wherein excess connector is rolled up (12*a*), is fitted over the wheel handle (12*b*) and is fitted over a tub spout (12*c*).
Figure 12A:
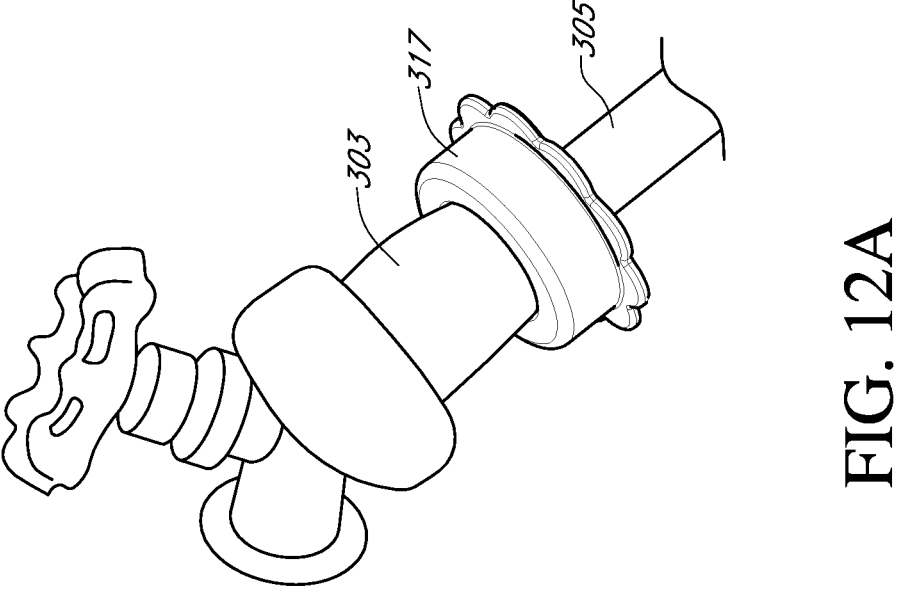
Figure 12C:
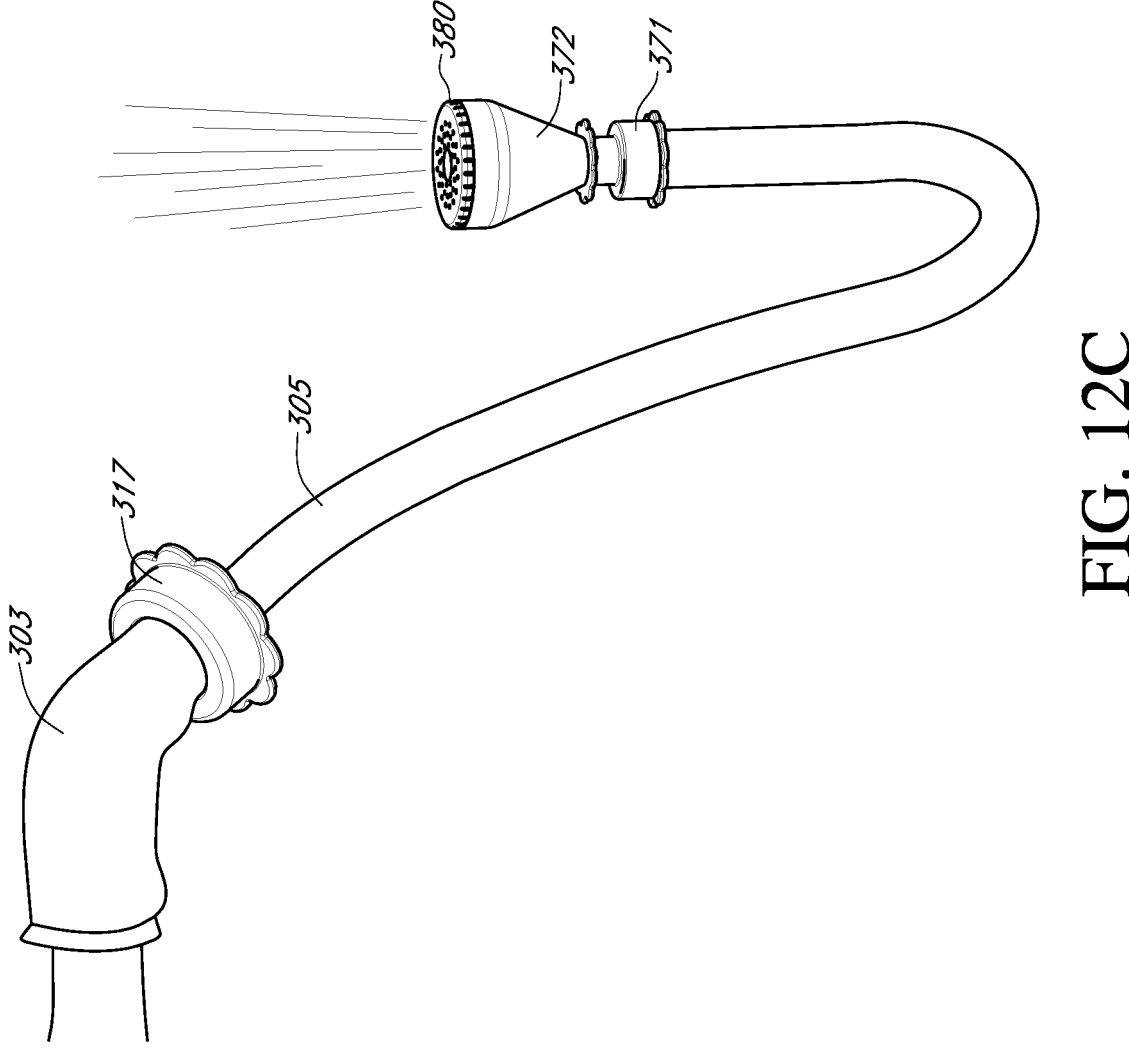

The connecter of the high pressure connector assembly was attached on the connector end to a hose bib in 2 different ways as shown in FIGS. 12a and b (one where the end of the connector was rolled down and another where the connector was stretched over the hose bib wheel handle). The other end of the high pressure connector assembly was attached to a female end of a standard garden hose. In each case, the water was turned on quickly until the valve was fully open, on full blast. The connectors each remained affixed to the hose bib and did not leak. When a spray head was attached to the other end of the garden hose and the hose bib valve was similarly opened quickly, each of the connectors remained affixed to the hose bib and did not leak and the connector did not balloon.

The TPR has a Shore Type A value of 0, a tensile stress of 0.18 MPa at 100% and 0.46 MPa at 300%, a tensile strength at least in one direction at break of 1.5 MPa, and a tensile elongation of 660% to break, using the ASTM methods herein.

The high pressure converter hose made from the connector was attached to several faucets as in Example 1 and had the same results.

Example 3

The connector in the high pressure converter hose in Example 1 was manufactured using a standard TPR material called ZT003-10 manufactured by Xiamen Shibo Rubber & Plastic Technology Co., LTD, which is a transparent TPR material to which color is added before it was molded into the TPR connector. The raw materials are mixed in the following proportion 99.972% TPR by weight and 0.028% colorant. The TPR ZT003-10 comprises polystyrene-block-poly(ethylene-ran-butylene)-block-polystyrene (SEBS) CAS #58-66070-4 (25% by weight), white mineral oil CAS #47-8042-5 (74.8% by weight) and polyethylene (PE) wax CAS #9002-88-4 (0.2% by weight).

Example 4

Figure 14:
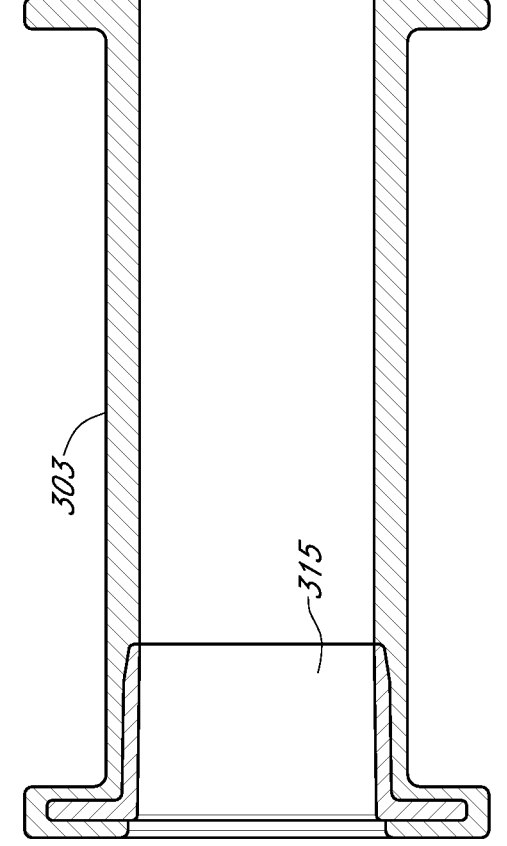
FIG. 14 is an embodiment of an integrated connector and insert (not drawn to scale).
Figure 15:
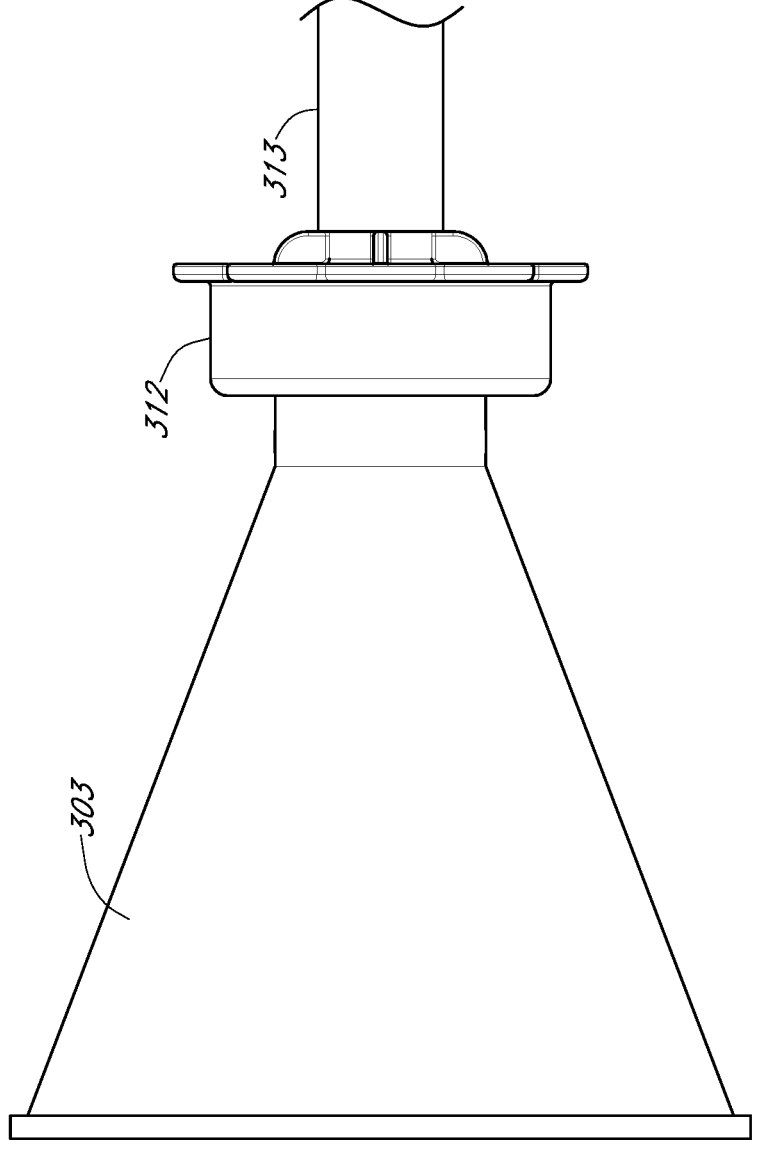
FIG. 15 is an embodiment of a cone shaped connector with a connector assembly suitable for larger shower heads.

The elastomeric connector is encased with the insert as in FIG. 14 to keep the connector more firmly connected in the connector assembly when in use.

Example 5—Secondary Considerations

Amazon ranks product sales (based on units sold) in various categories compared to other products listed in the same category. The original Rinseroo converter hose (having the same relevant proportions as the hose in Comparative Example 1 and with a 6 foot hose which replaced the 5 foot hose) and the high pressure converter hose, the "Tub Hose" (Example 1) are both listed in the Amazon Tools and Home Improvement category. Generally, a lower rank number means more unit sales. For example, the number one ranked product means the product has the highest relative sales of any product in that category in the measured time frame. The rank fluctuates daily and thus approximate monthly averages are provided below.

The high pressure converter hose marketed as the Rinseroo "Tub Hose" was launched in the second half of October 2022. Amazon ranked the high pressure converter hose, the Tub Hose, in the Tools and Home Improvement category at roughly 7300 in November 2022, and the rank steadily decreased month after month (i.e., the relative sales steadily increased) from November 2022 to May 2023, when Amazon ranked the Tub Hose at about 200 in this category.

The original Rinseroo converter hose launched in 2019 and reached about $1 million in sales in its first full year of sales in 2020. Double digit sales increases were achieved year over year since it was launched. Recently, the original Rinseroo converter hose has been phased out and was replaced with the same converter hose except with a slightly longer hose. In November 2022, Amazon ranked the original Rinseroo (with the longer hose) in the Tools and Home Improvement category at about 2200. The rank number steadily decreased (i.e., the relative sales steadily increased) month after month from November 2022 to May 2023, where Amazon ranked the original Rinseroo converter hose at about 300.

As evidence of commercial success, these data show that the high pressure converter hose, the Tub Hose, achieved commercial success by outranking the original Rinseroo without disturbing the ranking of the original Rinseroo over the same time frame.

The commercial success of the high pressure converter hose, the Tub Hose, is not the result of heavy promotion or advertising. The seller, who is the present inventor of the present application, pays Amazon for keyword searches that lead customers to the original Rinseroo converter hose or the high pressure converter hose. the Tub Hose. Although the high pressure converter hose outranks the original Rinseroo converter hose, the seller paid about half the amount in fees for the high pressure converter hose, that is, over 6 months for keyword searches for high pressure converter hose, versus over the same period of time for original Rinseroo converter hose. Thus, although about half the amount was paid to Amazon for keyword searches for the high pressure converter hose. the Tub Hose, sales were higher than the original Rinseroo converter hose.

In addition, the unit sales price for the high pressure converter hose was higher ($29.95) than the original Rinseroo ($26.95) during this timeframe, showing that consumers will pay a premium for the high pressure converter hose due to its advantageous properties.

As another indication of commercial success, the high pressure converter hose, marketed as the Tub Hose on Amazon, has been ranked the #1 Best Seller in the category of Bathtub & Shower Trim Systems.

Further, as evidence of fulfilling an unmet need, these data also show that the high pressure converter hose achieved a lower number rank (higher sales) faster than the original Rinseroo during the same time frame.

Comparative Example 1

A cylindrical connector as illustrated in FIGS. 6-13 of U.S. patent application Ser. No. 17/002,769 was manufactured from TPE super elastic plastic cylindrical elastomeric connector was made from a propriety blend comprising primarily about 75% Kraton™ G1651 H Polymer, a clear, linear copolymer based on styrene and ethylene/butylene with a polystyrene content of 33% and about 25% Kang Libo 15 #white oil cosmetic product, as well as other additives.

The connector was about 4.5' long, having an internal diameter of about 1" in its resting state. The distal end of the connector was produced with an approximately perpendicular and integral flange having a diameter of about 1.7". The outer diameter of the hose, not including the flange was about 1.25" and had a wall thickness of about ⅛".

A compression fitting was manufactured from acrylonitrile butadiene styrene (ABS) plastic having 3 parts: the insert, the female cap and a male component.

The insert was manufactured with a flanged base having a 1.7" diameter approximately perpendicularly (<91°) and integrally connected with an approximately 0.6" length tube having an internal diameter of about 0.95". The wall thickness was about 0.06".

The female cap was manufactured having a height of about 0.8" with a 1.85" diameter threaded opening on one end for accepting a male component, and a 1.25" diameter opening on the other end for accepting the connector. The female cap also comprised a decorative scalloped edge near the opening for receiving the male component.

A male component was manufactured with an approximately 0.55" threaded end for inserting into and securing the female cap, and an approximately 1.5" long tube portion having an approximately 0.56" internal diameter that tapers to 0.41" opening and otherwise had appropriate dimensions for inserting into the hose.

The proportion of the connector inner diameter to the hose inner diameter was about 2. The proportion of the inner diameter of the tube portion of the insert of about 0.95" to inner diameter of the male end that inserts into the hose of 0.41" was about 2.3. The length of the tube of the insert of about 0.62" to length of a 4.5" connector was about 0.14.

An approximately 3' long flexible hose made from polyvinyl chloride (PVC) having an internal diameter of about 0.5" was manufactured having a wall thickness of about ⅛"-¼".

The converter hose was assembled as illustrated in FIG. 7 U.S. patent application Ser. No. 17/002,769 and resulted in a converter hose as in FIG. 6 therein.

The converter hose was attached to the same tub spouts as in Example 1 and the water valve was opened like in Example 1. The connector detached from the tub spout when the faucet was turned immediately to maximum water flow without gradually increasing the water flow.

In addition, a spray head like the one in FIGS. 8-10 was attached to the converter hose and it caused the water to back up and caused the connector to balloon up with water and detach.

This converter hose was marketed on Amazon and elsewhere as the Rinseroo. Further, various complaints were received from Amazon reviewers regarding the flow being weak, and the lack of a spray head.

Comparative Example 2

Amazon.com offers the Camco RV 22484 Water Bandit Hose Fitting ("Water Bandit") advertised as comprising a silicone polymer connector portion and a standard metal hose fitting that measures about 3" long with the fitting and about 2.5" without the metal fitting. The silicone polymer portion is tapered and has an internal diameter of about $^{15}\!/_{16}$" and an outer diameter of about 1⅜" at its widest point.

The customer question and answers states: How wide would this stretch? Would it fit over a pull out kitchen faucet head about 2.5 inches in diameter? Answer: No. It doest [sic] stretch hardly at all. It only allows you to push it over an outside water faucet that maybe the threads have been stripped or is just a water pump type with no threads at all. Not to go over a kitchen faucet. When you push it on its thick so it allows for a good seal. Doesn't stretch much but conforms . . . . It was difficult to stretch over our slightly flared bathroom faucet. And then as soon as we turned the water on, the pressure caused it to slip right off . . . . It will not stretch that far I think an inch and half is about all you will get it to stretch.

In the reviews, according to a purchaser: "We . . . put onto spigot, turned water on. 1 second later the metal part with threads flew a few feet away. We put a hose clamp to keep that on, next the top part slid right off the spigot. WE [sic] put a hose clamp on the top part . . . ." According to another purchaser: "this thing won't even stay put with the pressure of my bathroom sink. Even with valves wide open it still pops off. On the rare occasion that it does stay on, it leaks like crazy. My faucet is like the ones listed that this product is supposed to be compatible with but nope, no go." Another purchaser states: "[if] you attach any kind of hose on it and it builds the slightest bit of pressure it blows right off." Yet another purchaser states: "The ¾" fitting is NOT FIXED into the rubber at all. With any back pressure it slides out easily . . . . This product is useless because any level of back pressure will make the metal fitting pop off . . . . AND if you ring clamp it to the faucet, the soft rubber will tear like jello." In addition, a reviewer states: "The key to this product is creating an adequate seal around the faucet. It failed to do so. While the rubber fits fairly snugly, there is a thing called 'water pressure', which the soft rubber is not capable of dealing with. We're not talking high pressure either, it's a kitchen faucet." Another reviewer states: "Doesn't hold on to the faucet like I expected it to." Another reviewer states: "it wouldn't stay tight on anything (bathroom sink, kitchen sink, shower head) and warm/hot water just makes it looser."

The invention claimed is:

1. A high pressure connector assembly comprising an elastomeric connector having an opening therethrough comprising a body portion and connector flange portion at a distal end thereof;

wherein the connector flange portion is approximately perpendicular to the body portion;

a rigid compression fitting having an opening aligned with the opening of the elastomeric connector;

wherein the rigid compression fitting comprises a female cap, a double sided male component, and an insert having dimensions to fit therebetween;

wherein the insert comprises a tube portion and an insert flange portion, wherein the insert flange portion is approximately perpendicular to the tube portion;

wherein the insert flange portion is proximate a first end of the insert and is about the same circumference as the connector flange portion; and wherein the tube portion is proximate a second end of the insert and has a length that is shorter than a length of the elastomeric connector and has an outer circumference that is about the same as an inner circumference of the elastomeric connector;

wherein the double sided male component comprises a male hose end that is configured to attach to a hose;

wherein a proportion of an inner diameter of the tube portion proximate the insert flange portion to a narrowest inner diameter of the male hose end, or a proportion of an inner circumference of the tube portion proximate the insert flange portion to a smallest inner circumference of the male hose end is 2:1 or less.

2. The high pressure connector assembly of claim 1 wherein a proportion of a distance between openings in the tube portion to a distance between openings of the elastomeric connector in its a resting state is about 0.16:1 to 0.25:1; and/or a proportion of a wall thickness of the elastomeric connector at the distal end thereof the distance between openings of the elastomeric connector in the resting state is about 0.06:1 to 0.12:1.

3. The high pressure connector assembly of claim 1 wherein the proportion of the inner diameter of the tube portion to the narrowest inner diameter of the male hose end, or the proportion of the narrowest inner circumference of the tube portion to the inner circumference of the male hose end is about 1:1 to 1.8:1.

4. The high pressure connector assembly of claim 1 wherein the inner diameter of the tube portion is about ⅞" to 1⅛" and the narrowest inner diameter of the male hose end is about ½ to ¾".

5. The high pressure connector assembly of claim 2 wherein the distance between the openings in the tube portion is at least 0.7" to about 2"; and wherein distance between openings of the elastomeric connector is about 3.5-5.5 inches.

6. The high pressure connector assembly of claim 2 wherein the wall thickness is about ¼" to ½"; and wherein distance between openings of the elastomeric connector is about 3.5-5.5".

7. The high pressure connector assembly of claim 1 wherein the male hose end is threaded and is configured to attach to a standard ¾" garden hose with a threaded fitting.

8. The high pressure connector assembly of claim 1 further comprising a spray head attachment comprising a standard female ¾" garden hose threaded fitting.

9. The high pressure connector assembly of claim 1 wherein a single one of the elastomeric connector self seals about peripheries of both a tub spout and a hose bib without detaching.

10. The high pressure connector assembly of claim 9 wherein the elastomeric connector does not detach from the tub spout or the hose bib when subjected to a flow rate of 5-10 GPM.

11. A high pressure converter hose comprising the high pressure connector assembly of claim 1, and a hose coupled to the male hose end.

12. The high pressure converter hose of claim 11 wherein the distal end of the elastomeric connector in a resting state has an inner diameter and/or an inner circumference, and a first end of the hose has an inner diameter and/or an inner circumference; and wherein a proportion of the inner diameter of the elastomeric connector at the distal end thereof in the resting state to the inner diameter of the first end of the hose, and/or a proportion of the inner circumference of the distal end of the elastomeric connector in the resting state to the inner circumference of the first end of the hose, is about 1:1 to 1.5:1.

13. The high pressure converter hose of claim 12 wherein the hose has an internal diameter of at least ⅝" to 1"; and/or wherein the elastomeric connector in the resting state has an internal diameter of at least ⅝" to 1".

14. The high pressure converter hose 13 wherein the elastomeric connector in the resting state has the internal diameter of about 1" and the hose has an internal diameter of ¾".

15. The high pressure converter hose of claim 11 wherein the hose is more rigid than the elastomeric connector.

16. A kit comprising the high pressure connector assembly of claim 1; and a spray head attachment comprising a standard female ¾" garden hose threaded fitting.

17. A method comprising providing the high pressure connector assembly of claim 1 and affixing the elastomeric connector to a water fixture.

\* \* \* \* \*